United States Patent
Gfroerer et al.

(10) Patent No.: US 12,503,574 B2
(45) Date of Patent: Dec. 23, 2025

(54) PELLETIZATION OF A POLYMER STABILIZER MIXTURE

(71) Applicant: BASF SE, Ludwigshafen am Rhein (DE)

(72) Inventors: Thomas Georg Gfroerer, Kaisten (CH); Heinz Herbst, Kaisten (CH); Oliver Reich, Ludwigshafen am Rhein (DE); Gazi Tuerkoglu, Ludwigshafen am Rhein (DE)

(73) Assignee: BASF SE

( * ) Notice: Subject to any disclaimer, the term of this patent is extended or adjusted under 35 U.S.C. 154(b) by 161 days.

(21) Appl. No.: 18/278,642

(22) PCT Filed: Feb. 18, 2022

(86) PCT No.: PCT/EP2022/054090
§ 371 (c)(1),
(2) Date: Aug. 24, 2023

(87) PCT Pub. No.: WO2022/179950
PCT Pub. Date: Sep. 1, 2022

(65) Prior Publication Data
US 2024/0158613 A1     May 16, 2024

(30) Foreign Application Priority Data
Feb. 25, 2021  (EP) .................................. 21159438

(51) Int. Cl.
*C08K 7/00*  (2006.01)
*B29B 9/12*  (2006.01)
(Continued)

(52) U.S. Cl.
CPC ............. *C08K 7/00* (2013.01); *B29B 9/12* (2013.01); *C08K 3/22* (2013.01); *C08K 5/098* (2013.01);
(Continued)

(58) Field of Classification Search
CPC .................................. C08K 7/00; B29B 9/12
See application file for complete search history.

(56) References Cited

U.S. PATENT DOCUMENTS

| | | | | |
|---|---|---|---|---|
| 4,144,302 A | * | 3/1979 | Calkins | ..................... B29B 9/06 264/300 |
| 5,176,751 A | * | 1/1993 | Findley | .................. C08K 3/013 106/272 |

(Continued)

FOREIGN PATENT DOCUMENTS

| | | |
|---|---|---|
| JP | 06-254845 A | 9/1994 |
| TW | 200914512 A | 4/2009 |

(Continued)

OTHER PUBLICATIONS

International Search Report and Written Opinion received for PCT Patent Application No. PCT/EP2022/054090, mailed on Jun. 8, 2022, 10 pages.

(Continued)

*Primary Examiner* — Nicholas Krasnow
(74) *Attorney, Agent, or Firm* — Faegre Drinker Biddle & Reath LLP

(57) ABSTRACT

The invention relates to a method for manufacturing a pellet in a pellet mill, which method comprises the steps of (A) pressing a mixture for compaction by a roller through a nozzle to obtain a strand, and (B) comminuting the strand to obtain the pellet, wherein the mixture for compaction comprises (i) 87 to 97 wt. % of a polymer stabilizer mixture polymer stabilizer mixture, which comprises the polymer stabilizers (i-1) 21 to 29 wt. % of tris(2,4-ditert-butylphenyl) phosphite (CAS-No. 31570-04-4), (i-2) 21 to 29 wt. % of tetrakis-[3-(3,5-ditert-butyl-4-hydroxy-phenyl)-propionyloxymethyl]methane (CAS-No. 6683-19-8), (i-3) 8 to 12 wt. % of a C16-C18 fatty acid calcium salt, (i-4) 36 to 44 wt. % of a calcium oxide, and wt. % of the polymer stabilizers (Continued)

(i-1), (i-2), (i-3) and (i-4) are based on the weight of the polymer stabilizer mixture, and (ii) 3 to 13 wt. % of a processing aid, which is a propylene-ethylene copolymer and which possesses a melting enthalpy below 100 J/g at 101.32 kPa. The pellet is useful for a dust-free handling of its polymer stabilizer mixture at a manufacturing of a stabilized polymer. Furthermore, a method for stabilizing a polymer, which is a polyolefin, a polystyrene or a mixture thereof, is disclosed, which comprises the dosing of the pellet to the polymer.

15 Claims, 7 Drawing Sheets

(51) Int. Cl.
*C08K 3/22* (2006.01)
*C08K 5/098* (2006.01)
*C08K 5/134* (2006.01)
*C08K 5/526* (2006.01)
*B29B 9/06* (2006.01)
*B29K 105/00* (2006.01)
*B29K 509/00* (2006.01)

(52) U.S. Cl.
CPC .............. *C08K 5/134* (2013.01); *C08K 5/526* (2013.01); *B29B 9/06* (2013.01); *B29K 2105/0044* (2013.01); *B29K 2509/00* (2013.01); *C08K 2003/2206* (2013.01)

(56) References Cited

U.S. PATENT DOCUMENTS

| | | | |
|---|---|---|---|
| 5,773,503 A * | 6/1998 | Steen ...................... | C09C 3/045 524/451 |
| 5,846,656 A | 12/1998 | Dunski | |
| 6,276,917 B1 * | 8/2001 | Gutierrez .................. | B29B 9/08 425/352 |
| 6,544,452 B1 * | 4/2003 | Stevens ..................... | B29B 9/10 264/109 |
| 6,596,198 B1 | 7/2003 | Semen | |
| 8,993,050 B2 * | 3/2015 | Abad ...................... | B29C 48/04 264/177.17 |
| 9,327,425 B2 * | 5/2016 | Ayats ........................ | B29B 9/10 |
| 11,332,594 B2 * | 5/2022 | Prissok ..................... | C08J 9/18 |
| 2001/0044518 A1 | 11/2001 | Hoffmann et al. | |
| 2008/0076857 A1 * | 3/2008 | D'Uva ..................... | B29B 9/12 524/133 |
| 2009/0062427 A1 * | 3/2009 | Tornow .................. | B29C 48/865 524/543 |
| 2009/0130443 A1 * | 5/2009 | Lustiger ................... | B29B 9/08 428/401 |
| 2010/0152341 A1 * | 6/2010 | Chatterjee ................ | C08K 3/01 524/169 |
| 2014/0308532 A1 * | 10/2014 | Elliott ..................... | C08K 5/005 428/475.2 |
| 2017/0014790 A1 * | 1/2017 | Yu .......................... | C08K 5/1345 |
| 2022/0348733 A1 * | 11/2022 | Krause ..................... | C08J 9/232 |
| 2024/0158613 A1 * | 5/2024 | Gfroerer .................. | C08K 5/134 |

FOREIGN PATENT DOCUMENTS

| | | |
|---|---|---|
| WO | 94/07946 A1 | 4/1994 |
| WO | 95/25767 A1 | 9/1995 |
| WO | 2008/033410 A1 | 3/2008 |
| WO | 2009/007265 A1 | 1/2009 |
| WO | 2021/048061 A1 | 3/2021 |

OTHER PUBLICATIONS

European Search Report for EP Patent Application No. 21159438.7, Issued on Aug. 6, 2021, 3 pages.

* cited by examiner

PELLETIZATION OF A POLYMER STABILIZER MIXTURE

CROSS-REFERENCE TO RELATED APPLICATIONS

This application is a National stage application (under 35 U.S.C. § 371) of PCT/EP2022/054090, filed Feb. 18, 2022, which claims benefit of European Application No. 21159438.7, filed Feb. 25, 2021, both of which are incorporated herein by reference in their entirety.

The current invention relates to a method for manufacturing a pellet, which method comprises the steps of pressing a mixture for compaction, which comprises a polymer stabilizer mixture, which contains tris(2,4-ditert-butylphenyl) phosphite, tetrakis-[3-(3,5-ditert-butyl-4-hydroxy-phenyl)-propionyloxymethyl]methane, a C16-C18 fatty acid calcium salt and a calcium oxide, and a processing aid, through a nozzle of a pellet mill to obtain a strand, and of comminuting the strands to obtain the pellet. A further embodiment is a pellet, which comprises the polymer stabilizer mixture and the processing aid. A further embodiment is a use of the pellet for a dust-free handling of its components at a manufacturing of a stabilized polymer. A further embodiment is a method for manufacturing of a stabilized polymer, which comprises the step of incorporating the pellet into a polymer, which is a polyolefin, a polystyrene or a mixture thereof, to obtain the stabilized polymer. A further embodiment is the mixture for compaction in the physical form of a powder.

An organic polymer, which is used as a constructive material to build or to be part of an article, is susceptible to degradation by oxidation, heat or light. There is a short-term degradation, which occurs at processing of the polymer, for example when the polymer obtained from the polymer synthesis is mechanically transformed into a desired final article or into an intermediate article. The intermediate article is often the product of a process, which serves to incorporate specifically desired additives into the polymer obtained from the polymer synthesis. The short-time degradation is often characterized by a relatively short exposure to a relatively high process temperature, for example above 80° C. to 330° C., which occurs in many instances in combination with mechanical stress. In contrast to the short-term degradation, the long-term degradation of a polymer, typically in the form of the desired final article, occurs during a foreseen use. The foreseen use of the desired final article might lead to a long-term expose of the polymer towards light, oxygen, increased temperatures, e.g. above room temperature but below 80° C., water or aggressive chemicals. Often, a mixture of polymer stabilizers is employed and sometimes, the mixture of polymer stabilizers provides synergistic effects in comparison to the single polymer stabilizers.

It is long known to incorporate a polymer stabilizer into an organic polymer for stabilization against degradation by oxidation, heat or light. The incorporation of the polymer stabilizer is typically done for a thermoplastic polymer during processing of the polymer, where the heated polymer possesses a reduced viscosity or is close to a liquid state and thus a homogenous distribution of the polymer stabilizer in the polymer is supported. A polymer stabilizer is very often solid at room temperature and obtained from its synthesis after work-up in the form of a powder.

Practical problems arise at the actual incorporation of a polymer stabilizer in powder form. Handling of a powder is prone to an easy generation of dust. Dust is critical from an occupational health perspective for workers at a manufacturing plant, from a plant safety perspective, e.g. a dust explosion, and from a plant cleanness perspective, e.g. a dust soiling of the plant equipment. Furthermore, the incorporation of the powder into a polymer is typically not conducted in a batch-wise manner. Instead, a continuous dosing of a powder to a polymer, which is processed in a continuous way for example in an extruder, in an amount which is typically below 0.5% by weight of the polymer is prone to fluctuations of the really incorporated amount in a specific moment of time. Hence, a large overall amount of polymer contains afterwards statistically the same amount of polymer stabilizer, but this not necessarily true for single units out of the overall amount of polymer. If a mixture of polymer stabilizers is incorporated into a polymer, the aforementioned dosing topics can get more problematic, if an additional demixing of the mixture of polymer stabilizers occurs. For example, even if the really incorporated amount in a specific moment of time is kept the same, a relative ratio of the individual polymer stabilizer to each other might fluctuate.

Several approaches are known for providing a suitable dust-free dosage form of a polymer stabilizer. One direction is to provide a suitable dust-free dosage form without adding a further ingredient, i.e. an ingredient is not needed as polymer stabilizer. For example, the polymer stabilizer in powder form is press-agglomerated via a roll compaction to obtain flakes. Another approach is the formation of pastilles from the polymer stabilizer in powder form by melting the mentioned one and let single drops of the melt solidify on a cooled surface. Another approach is the formation of pellets from the polymer stabilizer in powder form by heating and kneading the mentioned one in an extruder at a temperature above the softening point of the polymer stabilizer, extruding the heated mass through a die to form a warm strand and cutting the warm strand into pellets. Another direction is to provide a suitable dust-free dosage form by adding a further ingredient, i.e. an ingredient which is not needed as polymer stabilizer. The further ingredient, sometimes called compaction aid, binder or processing aid, in case of a polymeric further ingredient also masterbatch polymer or carrier polymer, acts typically as a type of hot-melt glue for the polymer stabilizer powder respectively its particles. Whether the polymer stabilizer itself melts to at least a major part depends on the applied temperature and the chemical nature of the further ingredient in relation to the polymer stabilizer, particularly whether a type of mutual solubility exists. An addition of a further ingredient in the dosage form of the polymer stabilizer has advantages. Particularly, a dosage form of a polymer stabilizer might be obtained initially dust-free simply by sieving respectively screening dust at the end of its manufacturing. However, attrition resistance of an initially dust-free dosage form is a property, which gets relevant in view of transport of the dosage form and associated formation of dust.

WO 94/07946 A1 relates to recycled plastics, predominantly thermoplastics, from domestic, commercial and industrial waste, which can be stabilized against thermooxidative degradation by adding a combination of a sterically hindered phenol with an organic phosphite or phosphonite and a metal salt of a fatty acid. At many of its inventive examples, a stabilizer mixture of tris(2,4-ditert-butylphenyl) phosphite, tetrakis-[3-(3,5-ditert-butyl-4-hydroxy-phenyl)-propionyloxymethyl]methane and calcium stearate in a weight ratio of 2:1:2 is shown at stabilization of high density polyethylene and/or polypropylene. In its description, the addition of the stabilizer mixture is proposed to occur in compact, extruded form, on a support material or directly as a mixture or in the form of powders.

JP H06-254845 relates to a granulated stabilizer with stated excellent anti-powdering properties and dispersibility by a method wherein after a powder of a heat stabilizer and a powder of an organic compounding agent with a lower melting point or softening point than that of the heat stabilizer are mixed at a specified ratio, the mixture is fed into a ring grating plate and is extruded into a granular shape from the grating plate by means of a rotating roller. 100 pts wt. powder of a heat stabilizer such as a lead salt, zeolite and a metal soap and 2-60 pts. wt powder of an organic compounding agent such as wax and a higher fatty acid are tea unto a mixer 1 and they are tightly mixed at a temperature being at most melting point or softening point of the organic compounding agent. This mixture is transferred into a container 10 and is heated at a temperature being at least melting point or softening point of the organic compounding agent. Stirring by means of a stirring blade 11 is made in such a way that shearing force to the mixture does not act substantially on the mixture. After the mixture is uniformly heated, it is transferred to a molding apparatus 14. A grating plate 16 with a lot of perforated holes 20 is provided in a ring-like shape in the molding apparatus 14 and a roller is rotated on its own axis and revolved on the grating plate 16. The heated mixture is pushed into the perforated holes 20 and is extruded into a granulated article 21.

WO 95/25767 A1 relates to high-density polyethylene (HDPE) which experiences a reduction in molecular weight during processing and is obtainable by means of catalysts of the Ziegler-Natta type. The HDPE can be stabilized against thermo-oxidative degradation by addition of a combination of a sterically hindered phenol and an organic phosphite or phosphonite and calcium oxide. In its comparative example C, a stabilization of HDPE with tris(2,4-ditert-butylphenyl) phosphite, tetrakis-[3-(3,5-ditert-butyl-4-hydroxy-phenyl)-propionyloxymethyl]methane and calcium stearate in a weight ratio of 2:1:2 is shown. In its inventive example 1, a stabilization of HDPE with tris(2,4-ditert-butylphenyl) phosphite, tetrakis-[3-(3,5-ditert-butyl-4-hydroxy-phenyl)-propionyloxymethyl]methane and calcium oxide in a weight ratio of 2:1:2 is shown. In its description, an incorporation of the stabilizer mixture to the polymer is proposed as in powder form, granular form or compacted form. Alternatively, a preparation of a masterbatch with LDPE as inert support is proposed.

U.S. Pat. No. 5,846,656 relates to a stabilizing system for stabilizing polymeric materials against ultraviolet light and thermooxidative deterioration, in which the stabilizing system is in pellet form. The pellet is formed from a substantially dry homogeneous mixture of at least one stabilizer and an agent which will prevent melting of the stabilizer. The stabilizer compound makes up about 50% to about 98% by weight of the mixture. The stabilizers are antioxidants such as phosphites and hindered phenols or hindered amine UV light stabilizers, or combinations thereof. The melt preventing agent may be a compound derived from a fatty acid or a fatty alcohol, or a fatty acid or a fatty alcohol, or a combination of fatty acids or fatty alcohols which makes up about 3% to 10% of the homogeneous mixture. The fatty acids, fatty alcohols, and the compounds derived therefrom preferably have a low melting point in the range of 50 to 100° C. and preferably between 50 to about 80° C. The melt preventing agent may alternatively be a lubricating agent having a small particle size, which makes up about 2 to 50% by weight of the homogeneous mixture.

US 2001/0044518 A1 relates to low-dust granules of plastic additives, comprising a) a phenolic antioxidant, an organic phosphite or phosphonite, a phosphonate, a sterically hindered amine or a UV absorber, individually, or a mixture of these compounds, and b) at least one epoxy compound which is solid at room temperature. The granules are particularly suitable for stabilizing polymers, especially polyolefins such as polypropylene or polyethylene. At its inventive example A12, a composition of bisphenol A diglycidyl ether Araldit GT 7072, tris(2,4-ditert-butylphenyl) phosphite, tetrakis-[3-(3,5-ditert-butyl-4-hydroxy-phenyl)-propionyloxymethyl]methane, calcium stearate and calcium oxide in a weight ratio of around 47:5:5:2:8 is compacted into a granule by extrusion in a co-kneader. At its inventive example B12, a composition of bisphenol A diglycidyl ether Araldit GT 7072, tris(2,4-ditert-butylphenyl) phosphite, tetrakis-[3-(3,5-ditert-butyl-4-hydroxy-phenyl)-propionyloxymethyl]methane, calcium stearate, calcium oxide and a polyethylene wax PE 520 in a weight ratio of around 47:5:5:2:8:7 is compacted into a granule by extrusion in a co-kneader. At its inventive example B13, a composition of bisphenol A diglycidyl ether Araldit GT 7072, tris(2,4-ditert-butylphenyl) phosphite, octadecyl 3-(3,5-di-tert-butyl-4-hydroxyphenyl)propionate and calcium stearate in a weight ratio of around 12:2:1:2 is compacted into a granule by extrusion in a co-kneader. At its comparative example 2, a compacted stabilizer mixture of tris(2,4-ditert-butylphenyl) phosphite, tetrakis-[3-(3,5-ditert-butyl-4-hydroxy-phenyl)-propionyloxymethyl]methane, calcium stearate and calcium oxide in a weight ratio of 5:5:2:8 is employed together with bisphenol A diglycidyl ether Araldit GT 7072 (with a relative weight of 47) for stabilization of a PP/EPDM polymer. At its comparative examples C1 and C2, stabilizer granules comprising bisphenol A diglycidyl ether Araldit GT 7072, tris (2,4-ditert-butylphenyl) phosphite, tetrakis-[3-(3,5-ditert-butyl-4-hydroxy-phenyl)-propionyloxymethyl]methane, calcium stearate and calcium oxide in a weight ratio of around 47:5:5:2:8 are employed for stabilization of a PP/EPDM polymer. It its description, it is proposed that the granules may also include additional substances, such as thermoplastic polymers (for example, polyolefins or polyolefin waxes).

U.S. Pat. No. 6,596,198 relates to a pelleted stabilizer additive system and a method of making same with a good pellet yield, preferably at least about 90 wt. %. The stabilizer additive system comprises at least a stabilizer and a processing aid, preferably a mold release agent. The processing aid has a lower melting temperature than the stabilizer. The stabilizer comprises less than 50 wt. % the combined total weight of the stabilizer and the mold release agent.

WO 2008-033410 relates to high concentration pelletized additive concentration or polymer stabilization agent or blends and their preparations, which can be used in various polymerization processes to enhance stability. The pelletized additive concentrates comprise at least 10 wt. % of a carrier polymer and are obtained in the examples by heating the additive mixtures together with the carrier polymer in an extruder above the melting temperature of the carrier polymer but lower than the melting temperature of the main additive, which is followed by cutting the warm strands into pellets. Example 4 results in pellets with a content of 48 wt. % tris(2,4-ditert-butylphenyl) phosphite and 10 wt. % tetrakis-[3-(3,5-ditert-butyl-4-hydroxy-phenyl)-propionyloxymethyl]methane at a pellet with an overall polymer stabilizer content of 70 wt. % and a content of polyethylene as a carrier polymer of 30 wt. %. Example 9 results in pellets with a content of 50 wt. % calcium stearate at a pellet with an overall polymer stabilizer content of 50 wt. % and a content of polyethylene as a carrier polymer of 50 wt. %.

International application No. PCT/EP2020/074965 relates to a method for manufacturing a pellet in a pellet mill, which method comprises the steps of (A) pressing a mixture for compaction by a roller through a nozzle to obtain a strand, and (B) comminuting the strand to obtain the pellet, wherein the mixture for compaction comprises (i) 87 to 97 wt. % of a polymer stabilizer, which is tris(2,4-ditert-butylphenyl) phosphite (CAS-No. 31570-04-4), and (ii) 3 to 13 wt. % of a processing aid, which is a propylene-ethylene copolymer and which possesses a melting enthalpy below 100 J/g at 101.32 kPa.

The pellet is useful for a dust-free handling of its polymer stabilizer at a manufacturing of the stabilized polymer. Furthermore, a method for stabilizing a polymer, which is a polyolefin, a polystyrene or a mixture thereof, is disclosed, which comprises the dosing of the pellet to the polymer.

There is still a need for further solid dosage forms of a polymer stabilizer mixtures, which are originally in the form of powders as starting material. In a first aspect, the manufacturing of a dosage form respectively of the dosage form units should ideally occur without warming of the polymer stabilizers or at least minimize it. First, this saves process energy, which would be necessary for warming of the polymer stabilizer mixture either by direct heating or by indirect heating, i.e. mechanical stress is transformed into thermal energy, which results in a clear increase of the temperature of the processed polymer stabilizer mixture. Secondly, this also avoids an unnecessary exposure of the polymer stabilizer mixture to an increased temperature. While an unnecessary exposure is in general to be avoided, an individual polymer stabilizer might also undergo a phase change, e.g. an originally crystalline material is transferred into a viscous state. Furthermore, the manufacturing of a dosage form should occur without generation of deficient product, i.e. the employed starting material of the polymer stabilizer mixture should be processed in a high percentage into the dosage form in one run. In other words, an amount of generated rejects should be low, even if the rejects are in a form that they can be re-employed directly as a starting material again. An example for removing rejects is a sieving of the desired dosage form to obtain an initially dust-free dosage form. In a second aspect, a dosage form of a polymer stabilizer mixture should after its manufacturing stay stable during storage and transport. Particularly, an initially dust-free dosage form might again generate dust respectively fines by attrition of the dosage form units versus each other at exposure to vibrations, for example during filling into a bag, at a transportation of the filled bag or at feeding operations of the dosage form units for incorporation into a polymer to be stabilized. Accordingly, a certain level of attrition resistance of the dosage form is desirable. In a third aspect, the units of a dosage form should ideally not be too diverse in its shape and weight, since this allows a more accurate feeding of the dosage form units at the incorporation into a polymer to be stabilized. A consequence of a more accurate feeding is especially at a continuous dosage into a polymer to be stabilized that the concentrations of the polymer stabilizer mixture and its individual polymer stabilizers are less fluctuating in the stabilized polymer. In other words, the local concentration of a polymer stabilizer at a certain part of the stabilized polymer shows less deviation from an average concentration of the polymer stabilizer in the whole stabilized polymer. If the feeding of the dosage form units occurs at the incorporation into the polymer to be stabilized at a stage, where the polymer is itself still present as solid units, e.g. pellets, then it is advantageous that the dosage form units are relatively similar in shape and weight to the solid units of the polymer. This disfavors that a mixture of the dosage form units and the solid units of the polymer to be stabilized segregate while being transported as a mixture. An example for such a transport is a pneumatic transport of a mixture of a polymer to be stabilized and the polymer stabilizer mixture from a storage facility to the equipment for the incorporation into the polymer, e.g. an extruder. In a fourth aspect, the dosage form of the polymer stabilizer mixture should contain a low content of an auxiliary ingredient. The auxiliary ingredient might be present only during a manufacturing of the dosage form, e.g. addition of a solvent, which is afterwards removed. The auxiliary ingredient might be present permanently, i.e. the composition of the dosage form contains an auxiliary ingredient, which will be incorporated into the polymer to be stabilized. In a fifth aspect, a stabilization of a polymer is supported by an ideally homogenous distribution of individual polymer stabilizer molecules throughout the polymer to be stabilized. Or in case that a polymer stabilizer is not soluble as an individual molecule in the polymer to be stabilized, aggregates of individual molecules of the insoluble polymer stabilizer or even larger particles out of aggregates of individual polymer stabilizer molecules are distributed homogenously in the polymer to be stabilized. The potential influence of a dosage form for a distribution of a polymer stabilizer is obvious by considering that at the beginning, all polymer stabilizer molecules are concentrated in the dosage form, whereas afterwards all polymer stabilizer molecules are ideally homogenously distributed in the polymer to be stabilized. An inhomogeneous distribution of a polymer stabilizer in the polymer to be stabilized might also get noticed differently to a decreased stability against degradation of the stabilized polymer in comparison to a polymer stabilized by a more perfect initial distribution like in case of mixing powders of polymer and polymer stabilizers. For example, an unevenly distributed polymer stabilizer in the stabilized polymer might disturb surface properties in case a thin polymer film manufacturing from the stabilized polymer or might lead to clogging of filters or nozzles in case a spin-extrusion of the stabilized polymer. The nature of the polymer to be stabilized interacts with a suitable polymer stabilizer. For example, a polyamide turns on its way to a molten state into a type of solvent comparable to dimethylsulfoxide, whereas a polyolefin typically turns on its way to a molten state only into a type of solvent like n-hexane or decaline. Hence, there is less potential for correction of the distribution of the polymer stabilizers in a polyolefin during its processing at a high temperature than in polyamide.

It has now been found a method for manufacturing a pellet in a pellet mill, which comprises a roller and a die with a nozzle, which method comprises the steps of (A) pressing a mixture for compaction by the roller through the nozzle to obtain a strand, and
(B) comminuting the strand to obtain the pellet,
wherein the mixture for compaction comprises
   (i) 87 to 97 wt. % of a polymer stabilizer mixture, which comprises the polymer stabilizers
       (i-1) 21 to 29 wt. % of tris(2,4-ditert-butylphenyl) phosphite (CAS-No. 31570-04-4),
       (i-2) 21 to 29 wt. % of tetrakis-[3-(3,5-ditert-butyl-4-hydroxy-phenyl)propionyloxymethyl]methane (CAS-No. 6683-19-8),
       (i-3) 8 to 12 wt. % of a C16-C18 fatty acid calcium salt,
       (i-4) 36 to 44 wt. % of a calcium oxide, and
       wt. % of the polymer stabilizers (i-1), (i-2), (i-3) and (i-4) are based on the weight of the polymer stabilizer mixture, and
   (ii) 3 to 13 wt. % of a processing aid, which is a propylene-ethylene copolymer and which possesses a melting enthalpy below 100 J/g at 101.32 kPa,
and wt. % is based on the weight of the mixture for compaction.

The weight percentages of the components (i) and (ii) of the mixture for compaction are based on the weight of the mixture for compaction. Accordingly, the weight percentages of all components contained in the mixture for compaction, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal to 100 wt. %.

The weight percentages of the polymer stabilizers (i-1), (i-2), (i-3) and (i-4) of the polymer stabilizer mixture are based on the weight of the polymer stabilizer mixture. Accordingly, the weight percentages of all components contained in the polymer stabilizer mixture, which includes the polymer stabilizers (i-1), (i-2), (i-3) and (i-4), summarizes to overall 100 wt. %. In other words, the sum of all components is 100 wt. %. The sum of polymer stabilizers (i-1), (i-2), (i-3) and (i-4) is below or equal to 100 wt. %. The overall amount of the polymer stabilizers (i-1), (i-2), (i-3) and (i-4) is in the range of 86 to 100 wt. %, preferably in the range of 90 to 100 wt. %, more preferably in the range of 93 to 100 wt. %, very preferably in the range of 95 to 100 wt. %, particularly in the range of 96 to 100 wt. %, more particularly in the range of 97 to 100 wt. %, very particularly in the range of 98 to 100 wt. %, especially in the range of 99 to 100 wt. % and more especially, the polymer stabilizer mixture consists out of the polymer stabilizers (i-1), (i-2), (i-3) and (i-4).

Preferred is a method, wherein the overall amount of the polymer stabilizers (i-1), (i-2), (i-3) and (i-4) in the polymer stabilizer mixture is in the range of 90 wt. % to 100 wt. %.

Preferred is a method, wherein the overall amount of the polymer stabilizers (i-1), (i-2), (i-3) and (i-4) in the polymer stabilizer mixture is in the range of 95 wt. % to 100 wt. %.

A polymer stabilizer serves to stabilize a polymer susceptible to oxidative, thermal or light-induced degradation against degradation by oxidation, heat or light.

Tris(2,4-ditert-butylphenyl) phosphite (CAS-No. 31570-04-4) is depicted below

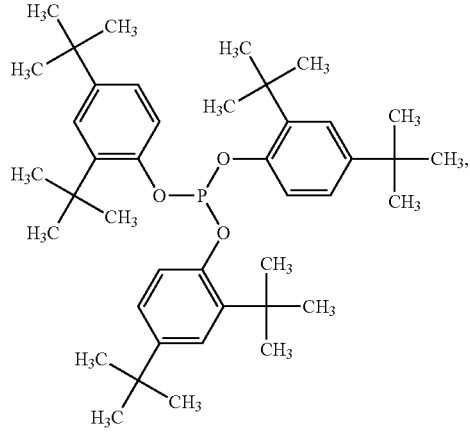 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

and contained for example in the commercial polymer stabilizer Irgafos 168 (TM BASF). It functions mainly as a short-term processing polymer stabilizer in a polymer. A short-term processing polymer stabilizer is employed against a short-time degradation, which is often characterized by a relatively short exposure of a polymer to a relatively high process temperature, for example above 80° C. to 330° C., which occurs in many instances in combination with mechanical stress.

Tetrakis-[3-(3,5-ditert-butyl-4-hydroxy-phenyl)-propionyloxymethyl]methane (CAS-No. 6683-19-8), which is sometimes also called pentaerythritol tetrakis-[3-(3,5-ditert-butyl-4-hydroxyphenyl)propionate] (CAS-No. 6683-19-8), is depicted below

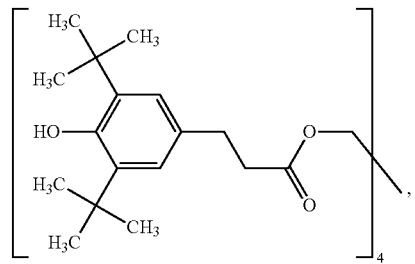

and is for example contained in Irganox 1010 (TM, commercially available from BASF SE). It functions as a long-term heat polymer stabilizer in a polymer.

A C16-C18 fatty acid calcium salt is herein understood as containing a stearic acid calcium salt (2:1) (CAS-No. 1592-23-0), which is depicted below

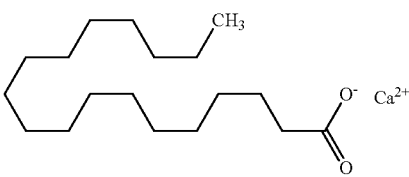

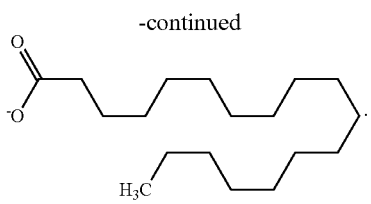

A C16-C18 fatty acid calcium salt is for example Ceasit FI VEG (TM, commercially available from Baerlocher GmbH, melting point between 140-160° C.). A C16-C18 fatty acid calcium salt is sometimes vegetable-based. Stearic acid is often the main fatty acid in a C16-C18 fatty acid calcium salt accompanied by a minor amount of palmitic acid. If so, a C16-C18 fatty acid calcium salt can also a mixed stearic acid palmitic acid calcium salt (2:1) as depicted below

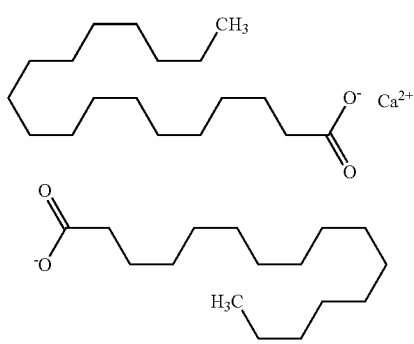

and palmitic acid calcium salt (2:1) as depicted below

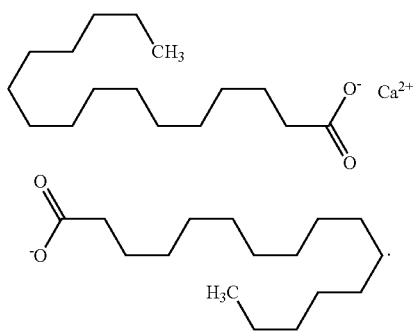

A C16-C18 fatty acid calcium salt functions as an acid scavenger, a lubricant or a release agent in a polymer. Preferably, the C16-C18 fatty acid calcium salt contains 80 to 100 parts by weight of calcium stearate or calcium palmitate and parts by weight are based on the overall amount of C16-C18 fatty acid calcium salt in the polymer stabilizer mixture, which is 100 parts by weight. More preferably, the C16-C18 fatty acid calcium salt contains 80 to 100 parts by weight of calcium stearate and parts by weight are based on the overall amount of C16-C18 fatty acid calcium salt in the polymer stabilizer mixture, which is 100 parts by weight.

Preferred is a method, wherein the polymer stabilizer mixture contains (i-3) 8 to 12 wt. % of a C16-C18 fatty acid calcium salt and 80 to 100 parts by weight of the C16-C18 fatty acid calcium salt is calcium stearate or calcium palmitate and parts by weight are based on the overall amount of C16-C18 fatty acid calcium salt in the polymer stabilizer mixture, which is 100 parts by weight.

A calcium oxide is herein understood as containing calcium oxide (CAS-No. 1305-78-8). The expression "a calcium oxide" or alternatively "calcium oxide containing material" means an untreated calcium oxide or a hydrophobized calcium oxide. The calcium oxide is preferably in the form of a powder. A hydrophobized calcium oxide is obtained for example from an untreated calcium oxide by treatment with a hydrohobization agent, preferably with a paraffin oil or with a fatty acid. Preferably, the calcium oxide is in the form of a powder and the powder is hydrophobized or untreated. The paraffin oil is preferably a paraffin oil with a content of aromatic components content below 2 wt. % based on the overall amount of oil applied for treatment, more preferably a paraffin oil with content of aromatic components below 1 wt. %, very preferably a paraffin oil with a content of aromatic components below 0.1 wt. % and particularly a paraffin oil free of aromatic components. The fatty acid is preferably a C12-C22 fatty acid, more preferably a saturated C12-C22 fatty acid, very preferably a saturated C12-C20 fatty acid, particularly a saturated linear C12-C20 fatty acid, more particularly a saturated linear C14-C18 fatty acid, very particularly a saturated linear C16-C18 fatty acid, especially a saturated linear C16-C18 fatty acid, more especially a palmitic acid or stearic acid and very especially a stearic acid. The fatty acid is preferably vegetable-based. The hydrophobization agent is preferably applied to an untreated calcium oxide in the form of a powder. The hydrophobization agent is applied in an amount to a calcium oxide in the form of a powder, which is low enough to avoid a clogging of the calcium oxide powder. In case of a fatty acid as a hydrophobization agent, a neutralization reaction at the surface of the calcium oxide is assumed to occur. In case of a paraffin oil, the surface of the calcium oxide is assumed to be coated. The hydrophobization agent is typically applied in an amount of 0.5 to 10 wt. % based on the hydrophobized calcium oxide, preferably in an amount of 0.8 to 8 wt. %, more preferably in an mount of 1.0 to 5 wt. %, very preferably in an amount of 1.2 to 4 wt. %, particularly in an amount of 1.3 to 3.5 wt. %, more particularly in an amount of 1.4 to 3.2 wt. and very particularly in an amount of 1.5 to 3 wt. %. A calcium oxide can comprise at its surface also traces of hydrolysis to calcium hydroxide due to traces of moisture. The active content of calcium oxide in a considered calcium oxide material is preferably between 85 and 100 wt. % based on the considered calcium oxide material, more preferably between 88 and 100 wt. %, very preferably between 89 and 99 wt. % and particularly approximately 90 wt. %. Kezadol DAB-P is a commercial example of a calcium oxide in powder form, which is treated with a paraffin oil. Calcium oxide functions as an acid scavenger stabilizer in a polymer.

Preferred is a method, wherein the calcium oxide is in the form of a powder and the powder is hydrophobized or untreated.

Preferred is a method, wherein the calcium oxide is in the form of a powder and is hydrophobized by a treatment with a paraffin oil or a fatty acid.

Preferred is a method, wherein the calcium oxide is in the form of a powder and is hydrophobized by a treatment with a paraffin oil.

Preferably, the polymer stabilizer mixture comprises the polymer stabilizers (i-1), (i-2), (i-3) and (i-4) in a relative weight ratio of (i-1):(i-2):(i-3):(i-4)=5:5:2:8.

Preferably, the polymer stabilizer mixture comprises the polymer stabilizers
- (i-1) 22 to 28 wt. % of tris(2,4-ditert-butylphenyl) phosphite (CAS-No. 31570-04-4),
- (i-2) 22 to 28 wt. % of tetrakis-[3-(3,5-ditert-butyl-4-hydroxy-phenyl)-propionyloxymethyl]methane (CAS-No. 6683-19-8),
- (i-3) 8 to 12 wt. % of a C16-C18 fatty acid calcium salt,
- (i-4) 37 to 43 wt. % of a calcium oxide, and wt. % of the polymer stabilizers (i-1), (i-2), (i-3) and (i-4) are based on the weight of the polymer stabilizer mixture; more preferably
- (i-1) 23 to 27 wt. % of tris(2,4-ditert-butylphenyl) phosphite (CAS-No. 31570-04-4),
- (i-2) 23 to 27 wt. % of tetrakis-[3-(3,5-ditert-butyl-4-hydroxy-phenyl)-propionyloxymethyl]methane (CAS-No. 6683-19-8),
- (i-3) 8 to 12 wt. % of a C16-C18 fatty acid calcium salt,
- (i-4) 38 to 42 wt. % of a calcium oxide, and wt. % of the polymer stabilizers (i-1), (i-2), (i-3) and (i-4) are based on the weight of the polymer stabilizer mixture; very preferably
- (i-1) 23 to 27 wt. % of tris(2,4-ditert-butylphenyl) phosphite (CAS-No. 31570-04-4),
- (i-2) 23 to 27 wt. % of tetrakis-[3-(3,5-ditert-butyl-4-hydroxy-phenyl)-propionyloxymethyl]methane (CAS-No. 6683-19-8),
- (i-3) 9 to 11 wt. % of a C16-C18 fatty acid calcium salt, and wt. % of the polymer stabilizers (i-1), (i-2), (i-3) and (i-4) are based on the weight of the polymer stabilizer mixture; particularly
- (i-1) 24 to 26 wt. % of tris(2,4-ditert-butylphenyl) phosphite (CAS-No. 31570-04-4),
- (i-2) 24 to 26 wt. % of tetrakis-[3-(3,5-ditert-butyl-4-hydroxy-phenyl)-propionyloxymethyl]methane (CAS-No. 6683-19-8),
- (i-3) 9 to 11 wt. % of a C16-C18 fatty acid calcium salt,
- (i-4) 39 to 41 wt. % of a calcium oxide, and wt. % of the polymer stabilizers (i-1), (i-2), (i-3) and (i-4) are based on the weight of the polymer stabilizer mixture.

Preferably, the polymer stabilizer (i-1), (i-2), (i-3) or (i-4) is in the form of a powder. More preferably, at least two of the polymer stabilizers (i-1), (i-2), (i-3) and (i-4) are in the form of a powder. Very preferably, at least three of the polymer stabilizers (i-1), (i-2), (i-3) and (i-4) are in the form or a powder. Particularly, all the polymer stabilizers (i-1), (i-2), (i-3) and (i-4) are in the form of a powder. A bulk density of a powder is determined complying to DIN EN ISO 17892-3. Preferably, the polymer stabilizer (i-1) is in the form of a powder and has a bulk density above 300 g/L and below 900 g/L as determined by DIN EN ISO 17892-3, more preferably above 350 g/L and below 600 g/L, very preferably above 380 g/L and below 550 g/L and particularly above 400 g/L and below 500 g/L. Preferably, the polymer stabilizer (i-2) is in the form of a powder and has a bulk density above 300 g/L and below 900 g/L as determined by DIN EN ISO 17892-3, more preferably above 450 g/L and below 700 g/L, very preferably above 480 g/L and below 680 g/L and particularly above 500 g/L and below 650 g/L. Preferably, the polymer stabilizer (i-3) is in the form of a powder and has a bulk density above 100 g/L and below 900 g/L as determined by DIN EN ISO 17892-3, more preferably above 150 g/L and below 600 g/L, very preferably above 170 g/L and below 500 g/L and particularly above 180 g/L and below 450 g/L. Preferably, the polymer stabilizer (i-4) is in the form of a powder and has a bulk density above 300 g/L and below 1000 g/L, more preferably above 500 g/L and below 850 g/L, very preferably above 550 g/L and below 800 g/L and particularly above 600 g/L and below 750 g/L.

The processing aid possesses a melting enthalpy below 100 J/g at 101.32 kPa, a melting peak temperature and a melting range. The melting enthalpy is determined by a differential scanning calorimetry (DSC) according to EN ISO 11357-3, preferably at atmospheric pressure, e.g. 101.32 kPa. The melting temperature and the melting range are also determined by the differential scanning calorimetry according to EN ISO 11357-3 preferably at atmospheric pressure, e.g. 101.32 kPa. Preferably, the EN ISO 11357-3 at atmospheric pressure is conducted with three consecutive heating cycles with (a) 0° C. to 200° C. at 10° C./min and 30 mL/min $N_2$, (b) 200° C. to 0° C. at 10° C./min and 30 mL/min $N_2$, (C) 0° C. to 200° C. at 10° C./min and 30 mL/min $N_2$.

Preferably, the melting enthalpy of the processing aid is above 5 J/g and below 100 J/g at 101.32 kPa, more preferably above 8 J/g and below 85 J/g, very preferably above 10 J/g and below 70 J/g, particularly above 10 J/g and below 55 J/g, more particularly above 11 J/g and below 40 J/g, very particularly above 11 J/g and below 30 J/g and especially above 11 J/g and below 25 J/g.

Preferred is a method, wherein melting enthalpy is below 50 J/g at 101.32 kPa.

Preferably, the melting enthalpy of the processing aid is above 5 J/g and below 20 J/g at 101.32 kPa, more preferably above 8 J/g and below 19 J/g, very preferably above 9 J/g and below 18 J/g, particularly above 10 J/g and below 17 J/g, more particularly above 11 J/g and below 16 J/g, very particularly above 11 J/g and below 15 J/g and especially above 12 J/g and below 14 J/g.

Preferred is a method, wherein the melting enthalpy is below 20 J/g at 101.32 kPa.

Preferably, the melting peak temperature of the processing aid is above 50° C. and below 85° C., more preferably above 55° C. and below 83° C., very preferably above 60° C. and below 81° C., particularly above 65° C. and below 80° C., more particularly above 70° C. and below 79° C., very particularly above 72° C. and below 78° C. and especially above 72° C. and below 77° C.

Preferred is a method for manufacturing a pellet, wherein the processing aid possesses a melting peak temperature above 50° C. and below 85° C.

Preferably, the melting range of the processing aid is between 20° C. and 100° C., more preferably between 21° C. and 99° C., very preferably between 22° C. and 98° C., particularly between 23° C. and 97° C., more particularly between 24° C. and 96° C., very particularly between 30° C. and 96° C., especially between 35° C. and 96° C. and more especially between 40° C. and 95° C.

The processing aid, which is a propylene-ethylene copolymer, has a weight average molecular weight (Mw), a number average molecular weight (Mn) and a polydispersity index (PD), which is the ratio between Mw and Mn. Preferably, the weight average molecular weight, the number average molecular weight and the polydispersity index are determined by gel permeation chromatography (GPC), very preferably by a high temperature gel permeation chromatography (HT-GPC) according to ISO 16014-4. At the gel permeation chromatography, a detector is preferably a refractive index detector (RI detector). A solvent is preferably trichlorobenzene. A column temperature is preferably 150° C. A calibration standard comprises preferably a polystyrene.

Preferably, the weight average molecular weight of the processing aid, which is a propylene-ethylene copolymer, is above 10000 Da (Dalton) and below 80000 Da, more preferably above 12000 Da and below 70000 Da, very preferably above 14000 Da and below 65000 Da, particularly above 30000 Da and below 60000 Da, more particularly above 33000 Da and below 47000 Da and very particularly above 35000 Da and below 45000 Da.

Preferred is a method, wherein the processing aid possesses a weight average molecular weight above 10000 Da and below 80000 Da.

Preferred is a method, wherein the processing aid possesses a weight average molecular weight above 30000 Da and below 60000 Da.

Preferably, the number average molecular weight of the processing aid, which is a propylene-ethylene copolymer, is above 2000 Da and below 23000 Da, more preferably above 3000 Da and below 20000 Da, very preferably above 4000 Da and below 19000 Da, particularly above 10000 Da and below 19000 Da, more particularly above 13000 Da and below 18000 Da and very particularly above 15000 Da and below 17000 Da.

Preferably, the polydispersity index of the processing aid, which is a propylene-ethylene copolymer, is above 1.3 and below 7, more preferably above 1.5 and below 5, very preferably above 1.7 and below 4, particularly above 1.9 and below 3.5, more particularly above 2.1 and below 3, very particularly above 2.3 and below 2.7 and especially above 2.3 and below 2.5.

Preferably, the weight average molecular weight of the processing aid, which is a propylene-ethylene copolymer, is above 10000 Da and below 80000 Da and the number average molecular weight is above 2000 Da and below 23000 Da, more preferably the weight average molecular weight is above 12000 Da and below 70000 Da and the number average molecular weight isabove 3000 Da and below 20000 Da, very preferably the weight average molecular weight is above 14000 Da and below 65000 Da and the number average molecular weight is above 4000 Da and below 19000 Da, particularly the weight average molecular weight is above 30000 Da and below 60000 Da and the number average molecular weight is above 10000 Da and below 19000 Da, more particularly the weight average molecular weight is above 33000 Da and below 47000 Da and the number average molecular weight is above 13000 Da and below 18000 Da and very particularly, the weight average molecular weight is above 35000 Da and below 45000 Da and the number average molecular weight is above 15000 Da and below 17000 Da.

Preferably, the polydispersity index of the processing aid, which is a propylene-ethylene copolymer, is above 1.3 and below 7 and the weight average molecular weight is above 10000 Da (Dalton) and below 80000 Da, more preferably the polydispersity index is above 1.5 and below 5 and the weight average molecular weight is above 12000 Da and below 70000 Da, very preferably the polydispersity index is above 1.7 and below 4 and the weight average molecular weight is above 14000 Da and below 65000 Da, particularly the polydispersity index is above 1.9 and below 3.5 and the average molecular weight is above 30000 Da and below 60000 Da, more particularly the polydispersity index is above 2.1 and below 3 and the average molecular weight is above 33000 Da and below 47000 Da and very particularly the polydispersity index is above 2.3 and below 2.7 and the average molecular weight is above 35000 Da and below 45000 Da.

It is understood that the polydispersity index correlates mathematically to the weight average molecular weight and the number average molecular weight. Hence in the following, the provided range for the polydispersity index means that only those specific polydispersity indices are intended, which can be achieved by choosing a suitable specific average molecular weight out of the provided range for the average molecular weight and by choosing a suitable specific number average molecular weight out of the provided range for the number average molecular weight. Preferably, the polydispersity index of the processing aid, which is a propylene-ethylene copolymer, is above 1.3 and below 7, the weight average molecular weight is above 10000 Da (Dalton) and below 80000 Da and the number average molecular weight is above 2000 Da and below 23000 Da. More preferably, the polydispersity index is above 1.5 and below 5, the weight average molecular weight is above 12000 Da and below 70000 Da and the number average weight is above 3000 Da and below 20000 Da. Very preferably, the polydispersity index is above 1.7 and below 4, the weight average molecular weight is above 14000 Da and below 65000 Da and the number average weight is above 4000 Da and below 19000 Da. Particularly, the polydispersity index is above 1.9 and below 3.5, the average molecular weight is above 30000 Da and below 60000 Da and the number average molecular weight is above 10000 Da and below 19000 Da. More particularly, the polydispersity index is above 2.1 and below 3, the average molecular weight is above 33000 Da and below 47000 Da and the number average molecular weight is above 13000 Da and below 18000 Da. Very particularly, the polydispersity index is above 2.1 and below 3, the average molecular weight is above 35000 Da and below 45000 Da and the number average molecular weight is above 15000 Da and below 17000 Da.

Preferably, the processing aid is in the form of a powder. A bulk density of the powder is determined complying to DIN EN ISO 17892-3. Preferably, the processing aid is in the form of a powder and has a bulk density above 200 g/L and below 800 g/L as determined by DIN EN ISO 17892-3, very preferably above 250 g/L and below 600 g/L, particularly above 280 g/L and below 400 g/L and very particularly above 300 g/L and below 400 g/L.

Preferably, the processing aid is a propylene-ethylene copolymer, which is a wax. Preferably, the processing aid is a propylene-ethylene copolymer wax, which is synthesized with a metallocene catalyst from propylene and ethylene. Preferably, the processing aid is a propylene-ethylene copolymer, which is long polymer chains are branched by short chains ($-CH_3$), very preferably branched essentially only be short chains and particularly branched only by short chains.

Preferably, the processing aid is a propylene-ethylene copolymer wax, which has a density at 23° C. according to ISO 1183 above 0.85 g/cm$^3$ and below 0.90 g/cm$^3$, very preferably 0.87 g/cm$^3$. Preferably, the processing aid is a propylene-ethylene copolymer wax, which has a drop point according to ASTM D 3954 above 80° C. and below 100° C., more preferably above 80° C. and below 95° C., very preferably above 82° C. and below 94° C. and particularly, the drop point is in a range between 83° C. and 90° C. Preferably, the processing aid is a propylene-ethylene copolymer wax, which has a viscosity at 170° C. according to DIN 53019 above 50 mPas and below 3000 mPas, more preferably above 100 mPas and below 2800 mPas, very preferably above 120 mPas and below 2600 mPas, particularly, above 1000 mPas and below 2500 mPas, more particularly above 1300 mPas and below 2300 mPas and very particularly, the viscosity is in a range between 1500 and 2100 mPas. Preferably, the processing aid is a propylene-ethylene copolymer wax, which is Licocene PP 1302 (TM Clariant) or Licocene PP 1502 (TM Clariant). More preferably, the processing aid is a propylene-ethylene copolymer wax, which is Licocene PP 1502 (TM Clariant).

Preferred is a method for manufacturing a pellet, wherein the processing aid is a propylene-ethylene copolymer, which is a wax.

Preferred is a method for manufacturing a pellet, wherein the mixture for compaction comprises
(i) 88 to 97 wt. % of the polymer stabilizer mixture, and
(ii) 3 to 12 wt. % of the processing aid.

Preferred is a method for manufacturing a pellet, wherein the mixture for compaction comprises
(i) 90 to 97 wt. % of the polymer stabilizer mixture, and
(ii) 3 to 10 wt. % of the processing aid.

Preferred is a method for manufacturing a pellet, wherein the mixture for compaction comprises
(i) 91 to 97 wt. % of the polymer stabilizer mixture, and
(ii) 3 to 9 wt. % of the processing aid.

Preferred is a method for manufacturing a pellet, wherein the mixture for compaction comprises
(i) 89 to 96 wt. % of the polymer stabilizer mixture, and
(ii) 4 to 11 wt. % of the processing aid.

Preferred is a method for manufacturing a pellet, wherein the mixture for compaction comprises
(i) 90 to 96 wt. % of the polymer stabilizer mixture, and
(ii) 4 to 10 wt. % of the processing aid.

Preferred is a method for manufacturing a pellet, wherein the mixture for compaction comprises
(i) 91 to 96 wt. % of the polymer stabilizer mixture, and
(ii) 4 to 9 wt. % of the processing aid.

Preferred is a method for manufacturing a pellet, wherein the mixture for compaction comprises
(i) 87 to 94 wt. % of the polymer stabilizer mixture, and
(ii) 6 to 13 wt. % of the processing aid.

Preferred is a method for manufacturing a pellet, wherein the mixture for compaction comprises
(i) 88 to 94 wt. % of the polymer stabilizer mixture, and
(ii) 6 to 12 wt. % of the processing aid.

Preferred is a method for manufacturing a pellet, wherein the mixture for compaction comprises
(i) 87 to 93 wt. % of the polymer stabilizer mixture, and
(ii) 7 to 13 wt. % of the processing aid.

Preferred is a method for manufacturing a pellet, wherein the mixture for compaction comprises
(i) 88 to 93 wt. % of the polymer stabilizer mixture, and
(ii) 7 to 12 wt. % of the processing aid.

A further ingredient, which is different to the polymer stabilizers (i-1), (i-2), (i-3), (i-4) and to the processing aid, can optionally be contained in the mixture of compaction. A further ingredient comprises a plurality of further ingredients. If so, the further ingredient can be named in general as component (iii), in case of a plurality of further ingredients accordingly component (iv) etc.

The further ingredient is preferably only contained in an amount up to 17 wt. % (=0 to 17 wt. %) based on the overall weight of the mixture for compaction. More preferably, the further ingredient is only contained in an amount up to 15 wt. % (=0 to 15 wt. %), very preferably in an amount up to 13 wt. % (=0 to 13 wt. %), particularly in an amount up to 11 wt. % (=0 to 11 wt. %), more particularly in an amount up to 9 wt. % (=0 to 9 wt. %), very particularly in an amount up to 7 wt. % (=0 to 7 wt. %), especially in an amount up to 5 wt. % (=0 to 5 wt. %), more especially in an amount up to 3 wt. % (=0 to 3 wt. %), very especially in an amount up to 1 wt. % (=0 to 1 wt. %). Most especially, the mixture for compaction is free of a further ingredient.

A further ingredient is for example another polymer stabilizer, another processing aid or a filler. Another polymer stabilizer is for example a phenolic antioxidant, which is different to the polymer stabilizer (i-2), an UV absorber, a hindered amine light stabilizer, a metal deactivator, a phosphite, which is different to the polymer stabilizer (i-1), a phosphonite, a hydroxylamine or amine N-oxide, a thiosynergist, an acid scavenger, which is different to the polymer stabilizer (i-3) and (i-4), or a peroxide scavenger. Another processing aid is for example an oleamide, erucamide, behenamide or glyceryl monostearate. A filler is for example silica, talc or wollastonite. Preferably, the further ingredient has a light absorption maximum at a wavelength below 380 nm, more preferably below 350 nm, very preferably below 300 nm, particularly below 280 nm, more particularly below 260 nm and very particularly no light absorption maximum above 250 nm. The further ingredient is preferably in the solid form. Preferably, the further ingredient is in the form of a powder. A bulk density of the powder is determined complying to DIN EN ISO 17892-3. More preferably, the further ingredient is in the form of a powder and has a bulk density above 200 g/L and below 950 g/L.

The polymer stabilizer mixture is preferably in a solid form. More preferably, the polymer stabilizer mixture is in the form of a powder. The processing aid is preferably in a solid form. More preferably, the processing aid is in the form of a powder. The mixture for compaction is preferably in a solid form. More preferably, the mixture for compaction is in the form of a powder.

Preferably, the mixture for compaction is obtained by a physical mixing in one step of the polymer stabilizers (i-1), (i-2), (i-3) and (i-4), the processing aid and optionally a further ingredient. More preferably, the mixture for compaction in the form of a powder is obtained by a physical mixing of the polymer stabilizers (i-1), (i-2), (i-3) and (i-4) in the form of powders and the processing aid in the form of a powder and optionally a further ingredient in the form of a powder. The physical mixing is preferably free of a complete melting of all the polymer stabilizers (i-1), (i-2), (i-3) and (i-4). The physical mixing is preferably free of a complete melting of the polymer stabilizer (i-2). The physical mixing is preferably free of a complete melting of the processing aid. The physical mixing is preferably free of a complete melting of an optional further ingredient. The physical mixing of the mixture for compaction is preferably free of dissolving at least one out of the polymer stabilizers (i-1), (i-2), (i-3) and (i-4) and the processing aid in a solvent. The solid particles of the powders of polymer stabilizers (i-1), (i-2), (i-3), (i-4) and the processing aid are homogeneously distributed in the mixture for compaction. The physical mixing can be conducted in batches or continuously, for example by using a blender. Another option of mixing in two steps is to first obtain the polymer stabilizer mixture and then second to obtain the mixture for compaction by a physical mixing of the polymer stabilizer mixture and the processing aid. Preferably, the polymer stabilizer mixture is obtained by a physical mixing of the polymer stabilizers (i-1), (i-2), (i-3) and (i-4) and optionally a further ingredient. More preferably, the polymer stabilizer mixture in the form of a powder is obtained by a physical mixing of the polymer stabilizers (i-1), (i-2), (i-3) and (i-4) in the form of powders and optionally a further ingredient in the form of a powder. The physical mixing is preferably free of a complete melting of all the polymer stabilizers (i-1), (i-2), (i-3) and (i-4). The physical mixing is preferably free of a complete melting of the polymer stabilizer (i-2). The physical mixing is preferably free of a complete melting of an optional further ingredient. The physical mixing of the mixture for compaction is preferably free of dissolving at least one out of the polymer stabilizers (i-1), (i-2), (i-3) and (i-4) in a solvent. Preferably, the solid particles of the powders of polymer stabilizers (i-1), (i-2), (i-3) and (i-4) are homogeneously distributed in the polymer stabilizer mixture. The physical mixing of the polymer stabilizer mixture can be conducted in batches or continuously, for example by using a blender. Another option is to first obtain the polymer stabilizer mixture and then obtain the mixture for compaction by a physical mixing of the polymer stabilizer mixture and the processing aid. It is preferred to obtain the mixture for compaction by a physical mixing in one step of the polymer stabilizers (i-1), (i-2), (i-3) and (i-4), the processing aid and optionally a further ingredient.

The mixture for compaction is the feed material in the method of manufacturing a pellet in a pellet mill. The mixture for compaction is typically continuously dosed to a section of the pellet mill comprising the die with the nozzle and the roller by gravity. If the temperature of the mixture for compaction at its dosing to the section of the pellet mill comprising the die with the nozzle and the roller is too high, a pasty mass forms at the roller area, which can lead to a failure of the method of manufacturing. The temperature of the mixture for compaction at dosing is preferably below 40° C., very preferably the dosing occurs at room temperature. The roller pre-compacts and degasses the feed material and presses the feed material through the nozzle. A cylindrical strand is formed. In more detail, the mixture for compaction as the feed material is further compacted in the feed zone of the nozzle, which can be cone-shaped, and begins to heat up and to sinter in a longish, typically cylindrically formed, channel of the nozzle by friction on the surface of the nozzle. The relevant surface of the nozzle is the surface of the channel, which is typically cylindrical, of the nozzle along the smallest diameter of the channel. The smallest diameter of the nozzle is herein defined as nozzle diameter. The press length is defined herein as the distance, where the smallest diameter of the cylindric channel applies. The cylindric channel of the nozzle might expand after the press length, but the expanded part of the cylindric channel does not contribute for building up friction by the feed material. The nozzle diameter and the pressing length are parameters, which are influencing the degree of sintering. The comminuting of the strand to obtain pellets occurs for example with a cutting knife as a comminuting device in an adjusted distance from the outer side of the die. The cutting knife cuts respectively breaks the strand to pellets with a varying length of typically 1 to 3 times of the nozzle diameter. Subsequently, the pellets are cooled and can be sieved, for example with a 1.6 mm sieve, which is for example done in a vibrating sieve. The sieved fines fraction consisting essentially of the mixture for compaction in a partly compacted form might be reused directly again as feed material or reused after a grounding. A more detailed description is provided in the experimental part at section D). It is noted that two or more steps (A) can occur prior to step (B), i.e. two or more pressings occur prior to a comminuting of the formed strand. A parameter for this is the distance between the ending of the press length and the comminuting device, for example the cutting knife.

Prior to step (A), the mixture for compaction is fed into the section of the pellet mill, which comprises the die with the nozzle and the roller. The mixture for compaction is preferably fed into the pellet mill in the form of a powder. This occurs preferably by gravity.

Preferred is a method for manufacturing a pellet, wherein the method comprises a step
(pre-A) feeding the mixture for compaction into the pellet mill, wherein the mixture for compaction is in the form of a powder,
and the step (pre-A) occurs before the step (A).

The formed strand has a surface temperature, which is increased after leaving the nozzle versus the surrounding temperature by the occurred friction. The surface temperature of the strand is determined for example by measurement of its infrared irradiation. Preferably, the surface temperature of the strand is above 45° C. and below 110° C., more preferably above 50° C. and below 80° C., particularly above 53° C. and below 75° C., very particularly above 55° C. and below 73° C.

Preferred is a method for manufacturing a pellet, wherein the strand has a surface temperature above 45° C. and below 110° C.

A pellet mill is preferably a ring die pellet mill or a flat die pellet mill. At a gear-type pellet mill, two gear wheels are acting as a roller and forming a nozzle and die equivalent by a spur-gearing situation between the gear-wheals, which leads to a compression and compaction of the mixture for compaction.

At a flat die pellet mill, there is also a variant with a rotating flat die and a stationary roller.

Preferred is a method for manufacturing a pellet, wherein the pellet mill is a ring die pellet mill, wherein the die has a geometric form of a ring with an inner side and an outer side and the nozzle represent a pass from the inner side to the outer side, or the pellet mill is a flat die pellet mill, wherein the die has a geometric form of a planar plate with an upper side and a lower side and the nozzle represents a pass from the upper side to the lower side.

Preferred is a method for manufacturing a pellet, wherein at the ring die pellet mill, the ring is rotating and the roller possesses a rotation axis, which is stationary, and at the flat die pellet mill, the die is stationary and the roller possesses a rotation axis, which is rotating.

The main factor for an amount of mechanical energy input is the ratio of the press length of a nozzle to the nozzle's nozzle diameter. For example, the surface temperature is influenced by a chosen press length of the nozzle and the nozzle diameter. Preferably, the ratio of the press length to the nozzle diameter is from 2 to 8, very preferably from 3 to 7, particularly from 4 to 6 and very particularly 5.

Preferred is a method for manufacturing a pellet, wherein the nozzle has a nozzle diameter and a press length, and a ratio of the press length to the nozzle diameter is from 2 to 8.

A roller, preferably two or more rollers, very preferably two or three rollers, are typically driven by friction between the roller, the mixture for compaction and the die. A smooth surface of the roller can lead to a slipping of the roller. A too high degree of slipping, which could lead to a failure of the method for manufacturing, is reduced by a corrugated surface of the roller. At a flat die pellet mill, there is also an option to drive the rollers by a kind of gear to control the degree of slipping or to avoid it.

Preferred is a method for manufacturing a pellet, wherein the roller surface is corrugated.

At the ring die pellet mill, another factor for an amount of mechanical energy input is the speed of the rotation of the ring die respectively its rotation frequency. At the flat die pellet mill, another factor for an amount of mechanical energy input is the speed of the roller in relation to the stationary die respectively the rotation frequency of the roller around its rotation axis. As a roller of the flat die pellet mill runs on a round die, there is only one line on the roller that has exactly the same speed as the die (relative speed=0). The part of the roller that is on the inner circle runs faster and the part of the roller that is on the outer circle runs slower. This means there is a small relative speed between roller and die which leads to a kind of milling of the material in this section.

Preferred is a method for manufacturing a pellet, wherein the pellet mill is a flat die pellet mill.

The number of dies at a pellet mill is driven by its construction design and engineering considerations thereof. Preferably, the pellet mill comprises one die. The number of rollers at a pellet mill is driven by its construction design and engineering considerations thereof. A higher number of rollers allow that in case of a die having two or more nozzles, which are located opposite to each other at the die, the steps (A) and (B) can occur more often over a certain time period at the pellet mill. The pellet mill comprises preferably two or more rollers, very preferably two, three or four rollers, particularly two or three rollers and very particularly two rollers. The number of nozzles at a die is driven by its construction design and engineering considerations. A higher number of nozzles at a die enables that the step (A) is occurring at individual nozzles in parallel or afterwards, which leads to the formation of two or more strands in parallel. Afterwards means here that a step (A) occurs at another nozzle prior to that a step (A) is repeated at the initially first nozzle again. Step (B) occurs then in principle in parallel, i.e. comminuting of the two or more strands occurs in principle in parallel. Thus, two or more pellets are obtained in principle in parallel. Hence, the output of the number of pellets in a certain time period increases significantly. The die of the pellet mill comprises preferably two or more nozzles, very preferably 48 to 20000, particularly 96 to 16000, very particularly 360 to 14000, especially 720 to 12000, very especially 1440 to 11000 and most especially 3600 to 10000.

Preferred is a method for manufacturing a pellet, wherein the pellet mill comprises two rollers.

Preferred is a method for manufacturing a pellet, wherein the pellet mill comprises a ring with two or more nozzles.

Preferred is a method for manufacturing a pellet, wherein the pellet mill comprises a flat die with two or more nozzles.

Preferred is a method for manufacturing a pellet, wherein the pellet mill comprises one ring.

Preferred is a method for manufacturing a pellet, wherein the pellet mill comprises one flat die.

Preferred is a method for manufacturing a pellet, wherein the pellet mill comprises two or more rollers and the die comprises two or more nozzles.

Preferred is a method for manufacturing a pellet, wherein the pellet mill comprises one die, two or more rollers and the die comprises two or more nozzles.

Preferred is a method for manufacturing a pellet, wherein the pellet mill comprises one die, two or more rollers and the die comprises two or more nozzles and the step (A) occurs at a first one of the two or more nozzles and at the same time or afterwards at a second one of the two or more nozzles but before step (A) occurs again at the first one of the two or more nozzles.

The pellet obtainable from the method for compaction comprises (i) 87 to 97 wt. % of a polymer stabilizer mixture, which comprises the polymer stabilizers (i-1) 21 to 29 wt. % of tris(2,4-ditert-butylphenyl) phosphite (CAS-No. 31570-04-4), (i-2) 21 to 29 wt. % of tetrakis-[3-(3,5-ditert-butyl-4-hydroxy-phenyl)propionyloxymethyl]methane (CAS-No. 6683-19-8), (i-3) 8 to 12 wt. % of a C16-C18 fatty acid calcium salt, (i-4) 36 to 44 wt. % of a calcium oxide, and wt. % of the polymer stabilizers (i-1), (i-2), (i-3) and (i-4) are based on the weight of the polymer stabilizer mixture, and (ii) 3 to 13 wt. % of a processing aid, which is a propylene-ethylene copolymer possessing a melting enthalpy below 100 J/g at 101.32 kPa, and wt. % of the components (i) and (ii) are based on the weight of the pellet.

30 The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal 35 to 100 wt. %.

The pellet has preferably a shape of a round rod. The shape of the round rod is idealized a cylinder, however the two base areas of the cylinder are in case of the pellet not always planar and parallel to each other, particularly not planar and parallel to each other. This is due to the comminuting the strand of the strand at step (B), which includes more elements of breaking than in case a strand, which is homogeneously warmed to a temperature above 110° C. is hot-cutted by a knife. The round rod has a diameter of a circle. Preferably, the round rod has a diameter of a circle, which is between 2 mm and 4 mm, very preferably 3 mm. A length of the pellet is herein understood as the longest distance in the direction of the strand formation in the nozzle, i.e. the axis of the pellet, which is defined by having in average the same distance to points of the pellet surface excluding those points at the surface of the pellet, which are generated through comminuting the strand. In case of a round rod, the axis of the pellet is the rotational axis of the round rod. A pellet has preferably a length of 1 to 3 times of the diameter of a circle. While one pellet has a specific length value itself, a plurality of pellets can have an average length of the pellets. This is caused by step (B) occurring by cutting with elements of breaking. Beneath the distance of the comminuting device at step (B), the design of the nozzle and its nozzle channel plays a role. One option is that the press length of the nozzle is followed by a section with a diameter, which is larger than the diameter of the nozzle. Hence, the nozzle comprises a channel with a press length section and an expanded section, which follows after the press length section. The expanded section allows that a desired thickness of the die is larger than the press length of the nozzle. A certain thickness of the die might be desired for mechanical strength reasons of the die, for example to avoid a breaking of the die.

A possible step (C) is a sieving of the pellets from step (B), for example with a 1.6 mm sieve. This removes fines originating from the method of manufacturing a pellet, for example at its step (B).

A possible step (D) is a cooling of the pellets. For example, a cooling leads to a pellet temperature, which is similar to a temperature surrounding the pellet mill. The temperature surrounding the pellet mill is preferably room temperature, more preferably 23° C. This cooling might already partly or completely take place while conducting the possible step (C). A cooling can be supported by a flow of air.

Alternatively, cooling of the pellets from step (B) is conducted before a sieving of the pellets. A possible step (C') is a cooling of the pellets from step (B). For example, a cooling leads to a pellet temperature, which is similar to a temperature surrounding the pellet mill. The temperature surrounding the pellet mill is preferably room temperature, more preferably 23° C. A possible step (D') is a sieving of the pellets from step (C'), for example with a 1.6 mm sieve.

The above described definitions and preferences for a method of manufacturing a pellet in a pellet mill, for the mixture for compaction, for a polymer stabilizer mixture and for the pellet are described for a method of manufacturing a pellet in a pellet mill. These definitions and preferences apply also to the further embodiments of the invention.

A further embodiment of the invention is a mixture for compaction, which comprises
- (i) 87 to 97 wt. % of a polymer stabilizer mixture in the physical form of a powder, which comprises the polymer stabilizers
  - (i-1) 21 to 29 wt. % of tris(2,4-ditert-butylphenyl) phosphite (CAS-No.
  - (i-2) 21 to 29 wt. % of tetrakis-[3-(3,5-ditert-butyl-4-hydroxy-phenyl)propionyloxymethyl]methane (CAS-No. 6683-19-8),
  - (i-3) 8 to 12 wt. % of a C16-C18 fatty acid calcium salt,
  - (i-4) 36 to 44 wt. % of a calcium oxide, and
  - wt. % of the stabilizers (i-1), (i-2), (i-3) and (i-4) are based on the weight of the polymer stabilizer mixture, and
- (ii) 3 to 13 wt. % of a processing aid in the physical form of a powder, which is a propylene-ethylene copolymer possessing a melting enthalpy below 100 J/g at 101.32 kPa,
and wt. % of the components (i) and (ii) are based on the weight of the mixture for compaction.

The weight percentages of the components (i) and (ii) of the mixture for compaction are based on the weight of the mixture for compaction. Accordingly, the weight percentages of all components contained in the mixture for compaction, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal to 100 wt. %.

The mixture for compaction is preferably in the form of a powder.

A further embodiment of the invention is a pellet, which comprises the components
- (i) 87 to 97 wt. % of a polymer stabilizer mixture, which comprises the polymer stabilizers
  - (i-1) 21 to 29 wt. % of tris(2,4-ditert-butylphenyl) phosphite (CAS-No. 31570-04-4),
  - (i-2) 21 to 29 wt. % of tetrakis-[3-(3,5-ditert-butyl-4-hydroxy-phenyl)propionyloxymethyl]methane (CAS-No. 6683-19-8),
  - (i-3) 8 to 12 wt. % of a C16-C18 fatty acid calcium salt,
  - (i-4) 36 to 44 wt. % of a calcium oxide, and
  - wt. % of the stabilizers (i-1), (i-2), (i-3) and (i-4) are based on the weight of the polymer stabilizer mixture, and
- (ii) 3 to 13 wt. % of a processing aid, which is a propylene-ethylene copolymer possessing a melting enthalpy below 100 J/g at 101.32 kPa,
and wt. % of the components (i) and (ii) are based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal to 100 wt. %.

Preferred is a pellet, which has a shape of a round rod and the round rod has a diameter of a circle, which is between 2 mm and 4 mm.

Preferred is a pellet, which has a length of 1 to 3 times of the diameter of a circle.

A further embodiment of the invention is a method for manufacturing a stabilized polymer, which comprises the steps of
- (AP) dosing a pellet into a polymer to obtain a pellet-polymer mixture,
- (BP) exposing the pellet-polymer mixture to a temperature in the range of 120 to 340° C. under mechanical stirring to obtain a stabilized polymer,
wherein the polymer is a polyolefin, a polystyrene or a mixture thereof,
wherein the pellet comprises
- (i) 87 to 97 wt. % of a polymer stabilizer mixture, which comprises the polymer stabilizers
  - (i-1) 21 to 29 wt. % of tris(2,4-ditert-butylphenyl) phosphite (CAS-No. 31570-04-4),
  - (i-2) 21 to 29 wt. % of tetrakis-[3-(3,5-ditert-butyl-4-hydroxy-phenyl)propionyloxymethyl]methane (CAS-No. 6683-19-8),
  - (i-3) 8 to 12 wt. % of a C16-C18 fatty acid calcium salt,
  - (i-4) 36 to 44 wt. % of a calcium oxide, and
  - wt. % of the stabilizers (i-1), (i-2), (i-3) and (i-4) are based on the weight of the polymer stabilizer mixture, and
- (ii) 3 to 13 wt. % of a processing aid, which is a propylene-ethylene copolymer possessing a melting enthalpy below 100 J/g at 101.32 kPa,
and wt. % of the components (i) and (ii) are based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal to 100 wt. %.

At step (AP), the size of the pellet is preferably a well-fitting size, since a too large pellet is more difficult to dose, to blend and to disperse in the polymer.

At step (BP), the pellet components are homogeneously dispensed and/or dissolved in the polymer to be stabilized under mechanical stirring. This is supported by the heat exposure of the pellet-polymer mixture, which leads to a lowering of the viscosity of the polymer on one side and a melting of pellet components on the other side, if the respective melting range of a component is reached. Preferably, the temperature at step (BP) is in the range from 135° C. to 330° C., very preferably from 150° C. to 310° C., particularly from 180° C. to 300° C., very particularly from 190° C. to 290° C., especially from 200° C. to 280° C. and very especially from 210° C. to 260° C.

A polyolefin is for example:
1. A homopolymer of mono-olefins and di-olefins, for example polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene, for example high density polyethylene (HDPE), medium density polyethylene (MDPE), low density polyethylene (LDPE), linear low density polyethylene (LLDPE), or a mixture thereof, for example mixtures of polypropylene with polyisobutylene, polypropylene with polyethylene (for example PP/HDPE, PP/LDPE) or mixtures of different types of polyethylene (for example LDPE/HDPE).
2. A copolymer of mono-olefins or di-olefins with each other or with other vinyl monomers, for example ethylene/propylene copolymers, propylene/but-1-ene copolymers, propyl-ene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers, for example ethylene/norbornene like COC, ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another, or mixtures with other polyolefins, for example polypropylene/ethylene-propylene copolymers, LDPE/ethylene-vinyl acetate copolymers (EVA), or LDPE/ethylene-acrylic acid copolymers (EAA).

Polyolefins of mono-olefins, preferably polyethylene and polypropylene, can be prepared by different, and especially by the following methods:
a) radical polymerisation (normally under high pressure and at elevated temperature)
b) catalytic polymerisation using a catalyst that normally contains one or more than one metal of groups 4, 5, 6 (for example chromium) or 7 of the Periodic Table. These metals usually have one or more than one ligand, typically oxides, halides, alcoholates, esters, ethers, amines, alkyls, alkenyls and/or aryls that may be either pi- or sigma-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups 1, 2 and/or 3 of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

A polystyrene is for example:
1. A homopolymer of styrene.
2. A copolymer of styrene and a co-monomer, which is for example ethylene, propylene, dienes, nitriles, acids, maleic anhydrides, maleimides, vinyl acetate, acrylic derivatives and mixtures thereof, for example styrene/butadiene, styrene/acrylonitrile, styrene/ethylene, styrene/alkyl methacrylate, styrene/butadiene/alkyl acrylate, styrene/butadiene/alkyl methacrylate, styrene/maleic anhydride, styrene/acrylonitrile/methyl acrylate, block copolymers of styrene with a co-monomer, for example styrene/butadiene/styrene, strene/isoprene/styrene, styrene/ethylene/butylene/styrene or styrene/ethylene/propylene/styrene.
3. Graft copolymers of styrene, for example styrene on polybutadiene, styrene on polybutadiene-styrene or polybutadiene-acrylonitrile copolymers, styrene and acrylonitrile on polybutadiene, styrene, acrylonitrile and methyl methacrylate on polybutadiene, styrene and maleic anhydride on polybutadiene, styrene, acrylonitrile and maleimide on polybutadiene, styrene and maleimide on polybutadiene, styrene and alkyl acrylates or methacrylates other than methyl acrylate on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers.

At a copolymer of a polyolefin, at least two different monomers are copolymerized. Preferred is a copolymer of a polyolefin, wherein the weight content of the polymerized olefinic monomer is above 50% based on the weight of all polymerized monomers. At a copolymer of a polystyrene, at least two different monomers are copolymerized or one monomer is grafted on at least a different monomer, which has been polymerized. Preferred is a copolymer of a polystyrene, wherein the weight content of polymerized or grafted styrene is above 50% based on the weight of all polymerized or grafted monomers.

Preferably, the polymer, which is a polyolefin, a polystyrene or a mixture thereof, is thermoplastic, i.e. it can be shaped into a new form at an elevated temperature, for example at a temperature in the range from 120° C. to 340° C., especially from 135° C. to 330° C.

The polymer, which is a polyolefin, a polystyrene or a mixture thereof, is susceptible to oxidative, thermal or light-induced degradation.

An amount of pellets to be dosed to the polymer, which is a polyolefin, a polystyrene or a mixture thereof, varies with the particular polymer and the desired degree of protection against oxidative, thermal or light-induced degradation. Preferably, the amount of pellets in weight percent is from 0.01 to 5 wt. % based on the weight of the polymer, very preferably from 0.02 to 3 wt. %, particularly from 0.04 to 2 wt. %, very particularly from 0.05 to 1 wt. %, especially from 0.08 to 0.8 wt. % and very especially from 0.1 to 0.4 wt. %.

Preferred is a method for manufacturing a stabilized polymer, wherein step (BP) takes place in an extruder or a co-kneader.

At step (AP), the pellet can be dosed to the polymer, which has already a polymer temperature in the range of 120 to 340° C. For example, the pellet is dosed to the polymer, which is already warmed in the extruder or co-kneader. For example, the pellet is introduced by a feeder, which is for example an extruder, into the already warm and viscous polymer to be stabilized. Accordingly, the pellet-polymer mixture has immediately the temperature of the polymer temperature in the range of 120 to 340° C. and the pellet starts to disintegrate.

Preferred is a method for manufacturing a stabilized polymer, wherein the polymer to which the pellet is dosed in step (AP) has a polymer temperature in the range of 120 to 340° C.

At step (AP), the pellet can be dosed to the polymer, which has a polymer temperature below 40° C. In case the polymer is present in the form of pellets, a pellet-polymer mixture is generated, which comprises the components (a) pellets and (b) polymer pellets. Pellets of a polymer have for example the geometric form of a cylinder and are obtained for example by hot-cutting of an extruded warm polymer strand followed by cooling in a water quench. A pellet-polymer mixture obtained in step (AP), wherein the polymer is in the form of pellets, can be prepared and stored independently from step (BP) or prepared directly before step (BP).

Preferred is a method for manufacturing a stabilized polymer, wherein the polymer to which the pellet is dosed in step (AP) is present in the form of pellets and has a polymer temperature below 40° C.

The definitions and preferences described for a method of manufacturing a stabilized polymer or applying thereto apply also to the further embodiments of the invention.

A further embodiment of the invention is a use of a pellet for a dust-free handling of its components at manufacturing of a stabilized polymer, wherein the polymer is a polyolefin, a polystyrene or a mixture thereof and wherein the pellet comprises
  (i) 87 to 97 wt. % of a polymer stabilizer mixture, which comprises the polymer stabilizers
    (i-1) 21 to 29 wt. % of tris(2,4-ditert-butylphenyl) phosphite (CAS-No. 31570(04-4),
    (i-2) 21 to 29 wt. % of tetrakis-[3-(3,5-ditert-butyl-4-hydroxy-phenyl)propionyloxymethyl]methane (CAS-No. 6683-19-8),
    (i-3) 8 to 12 wt. % of a C16-C18 fatty acid calcium salt,
    (i-4) 36 to 44 wt. % of a calcium oxide, and
    wt. % of the stabilizers (i-1), (i-2), (i-3) and (i-4) are based on the weight of the polymer stabilizer mixture, and
  (ii) 3 to 13 wt. % of a processing aid, which is a propylene-ethylene copolymer possessing a melting enthalpy below 100 J/g at 101.32 kPa,
  and wt. % of the components (i) and (ii) are based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of all components comprises beneath the components (i) and (ii) also a potential further ingredient. The sum of components (i) and (ii) is below or equal to 100 wt. %.

BRIEF DESCRIPTIONS OF FIGURES

Figure 1:
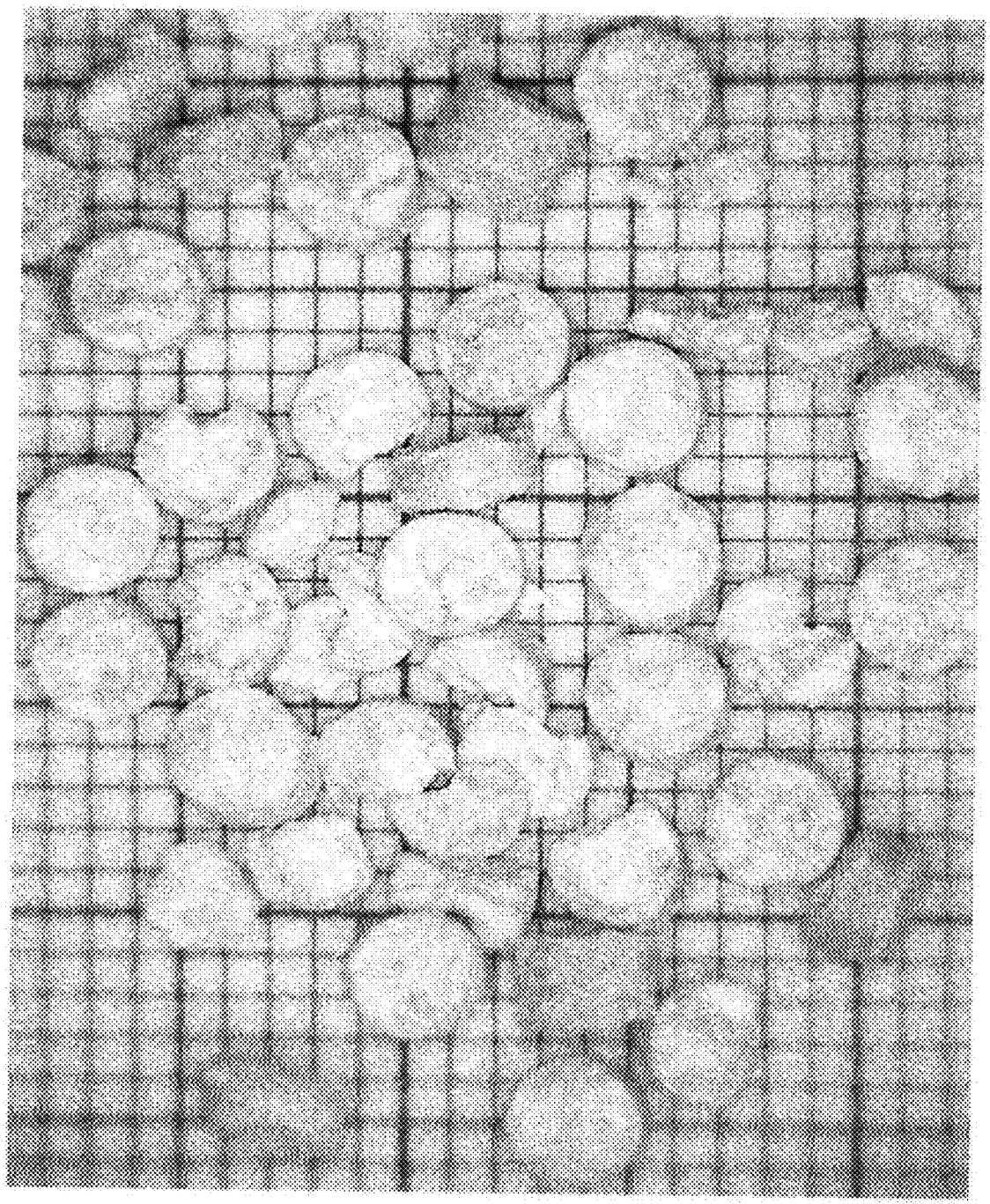
FIG. 1 shows pellets obtained from example D-11-1, which are placed on a millimeter paper.
Figure 2:
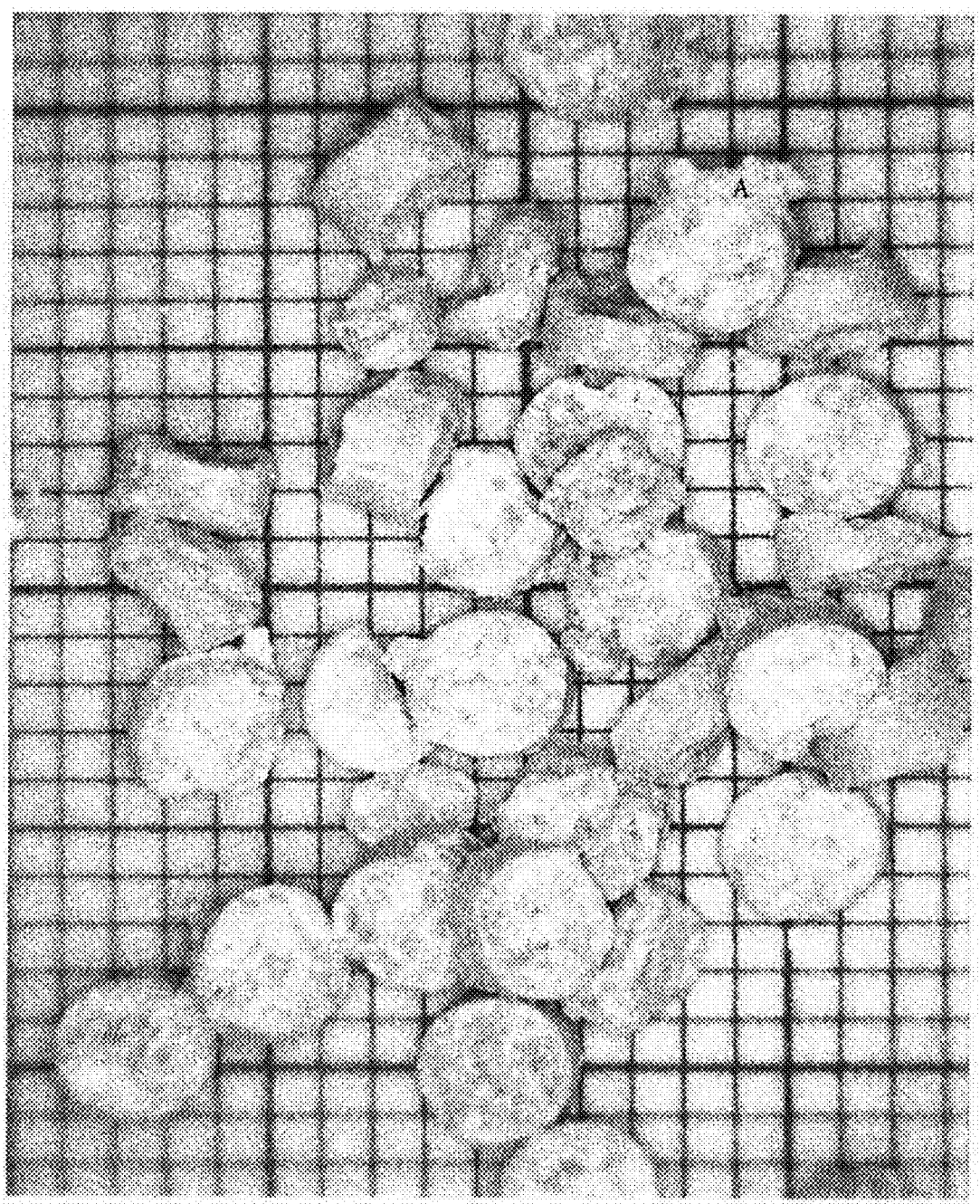
FIG. 2 shows pellets obtained from example D-11-2, which are placed on a millimeter paper.
Figure 3:
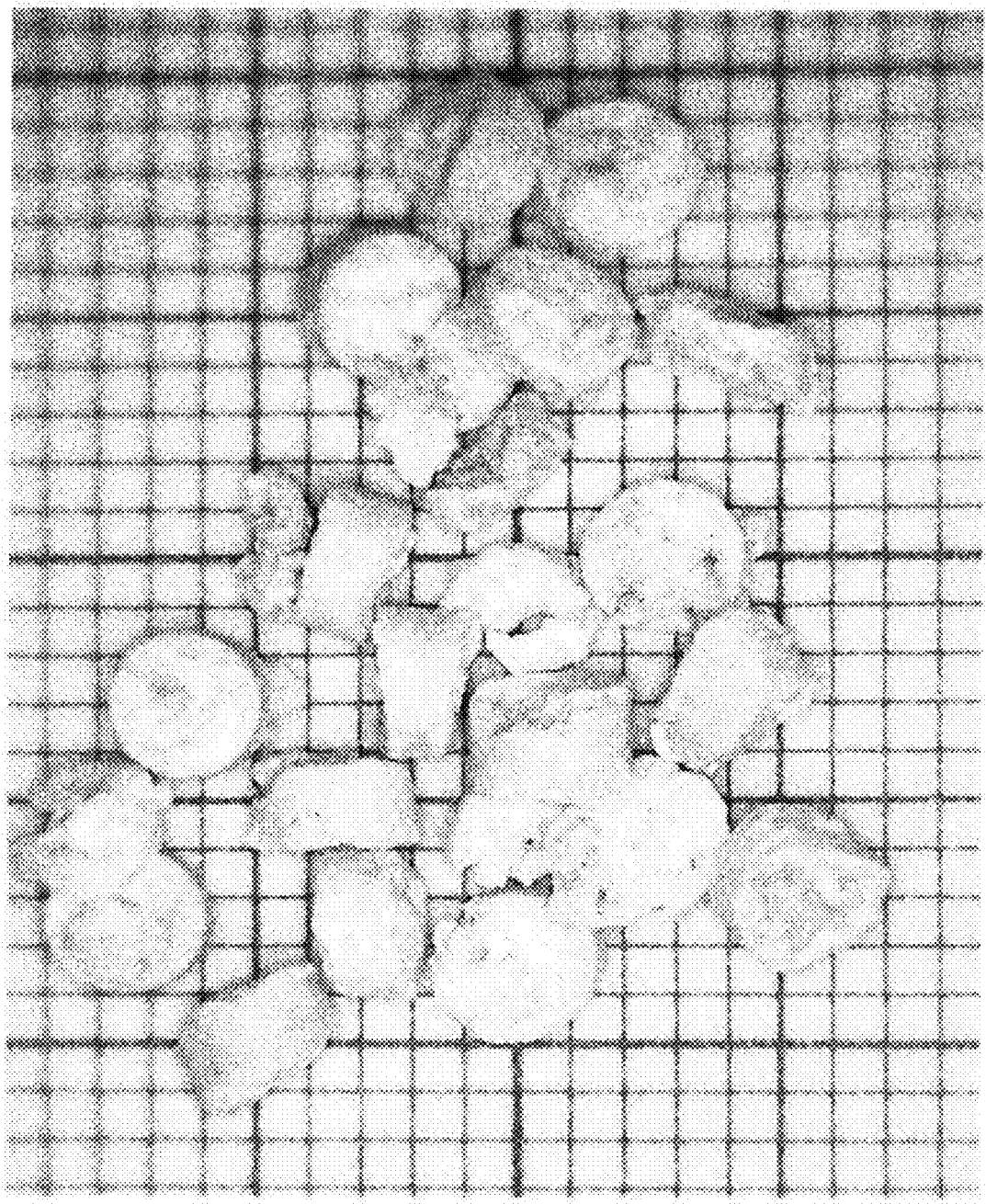
FIG. 3 shows pellets obtained from example D-11-3, which are placed on a millimeter paper.
Figure 4:
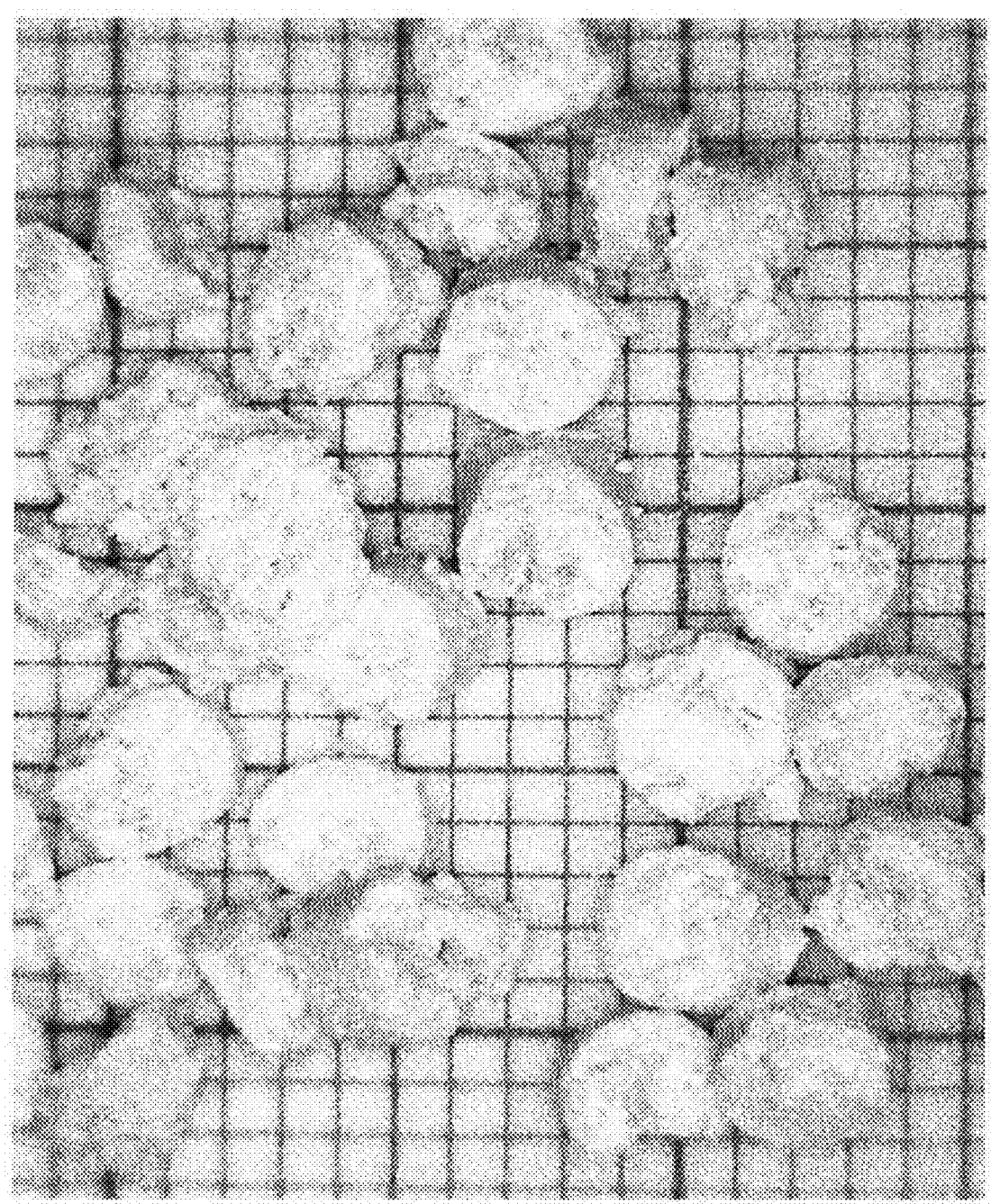
FIG. 4 shows pellets obtained from example D-11-4, which are placed on a millimeter paper.
Figure 5:
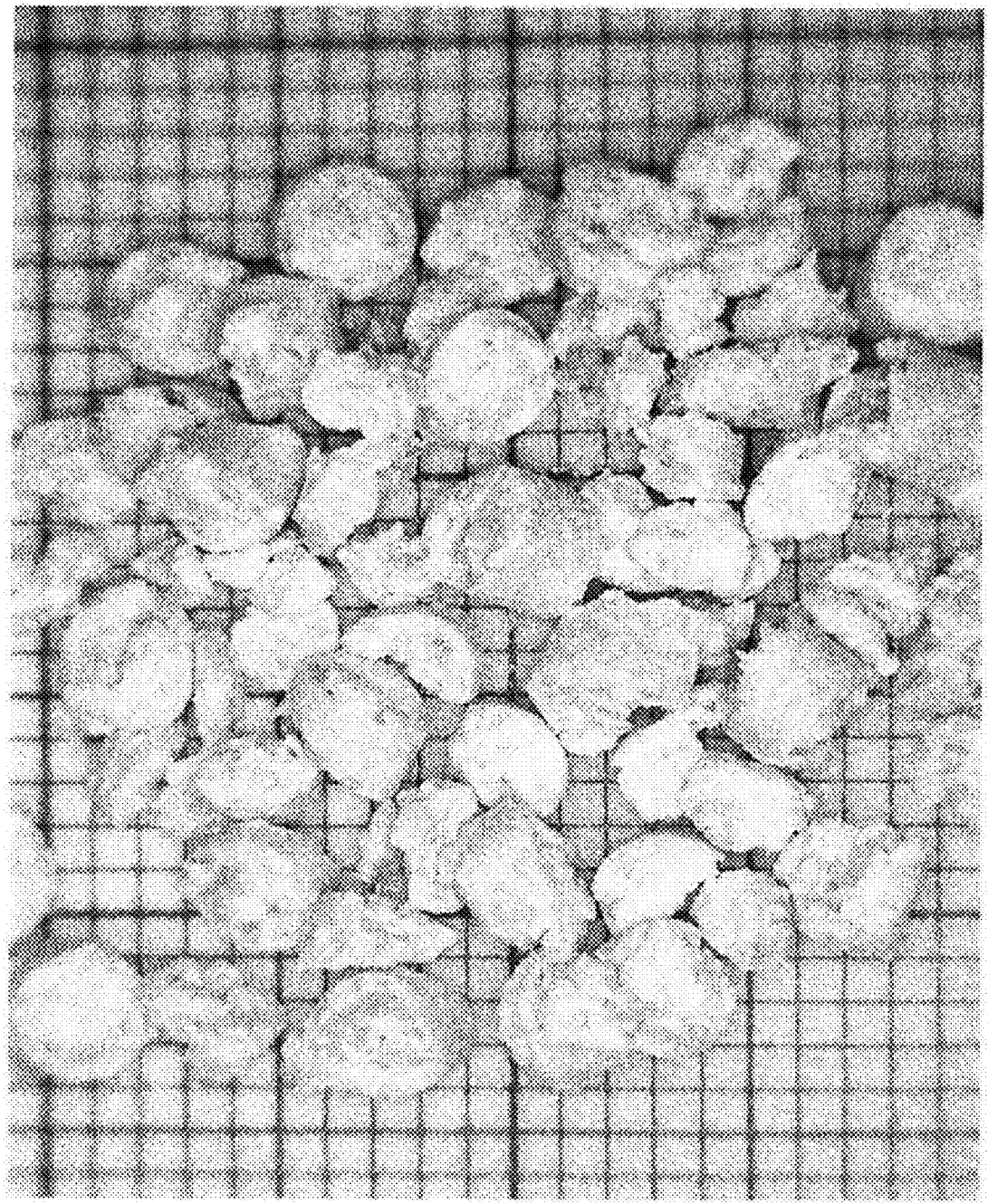
FIG. 5 shows pellets obtained from example D-11-5, which are placed on a millimeter paper.
Figure 6:
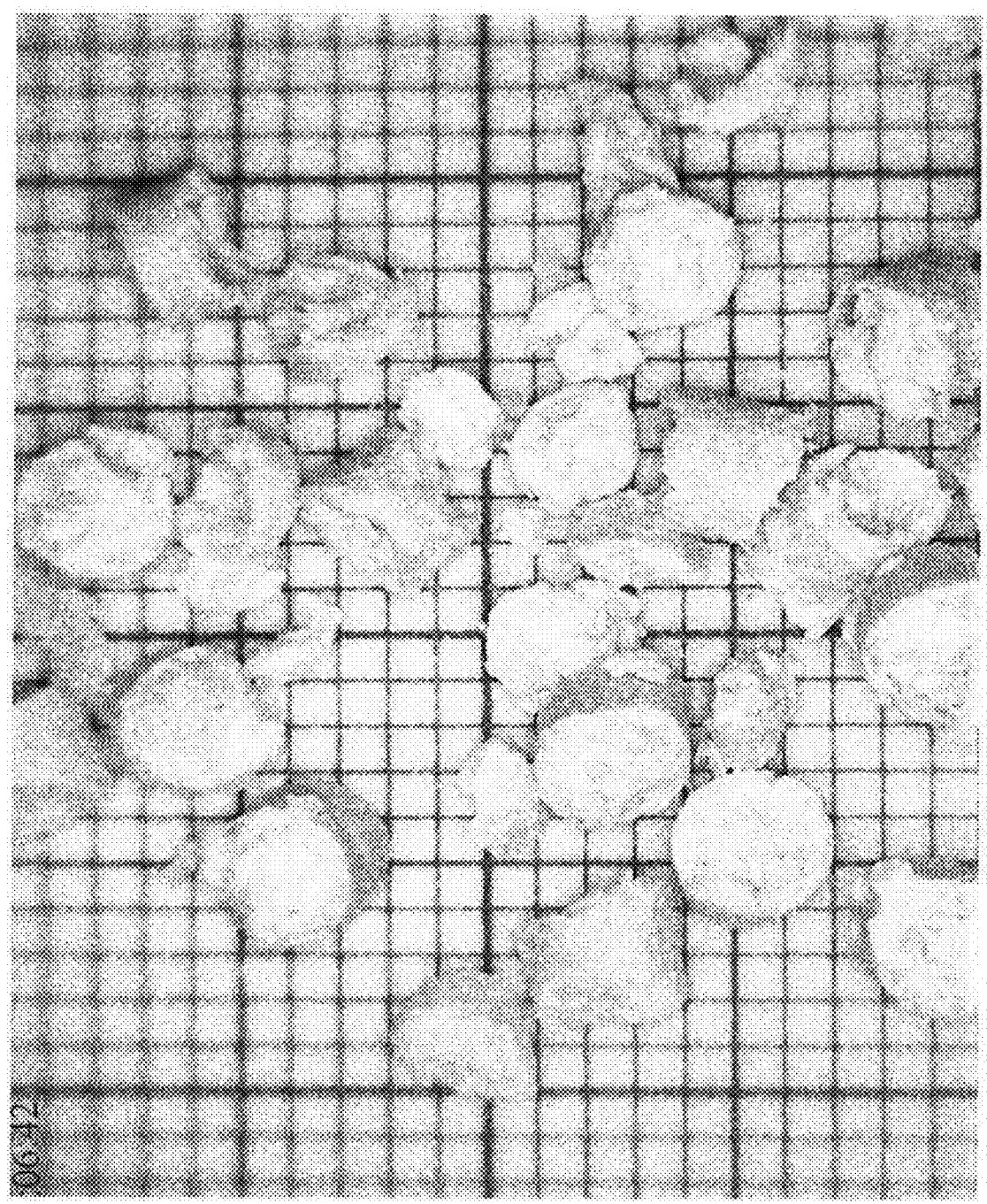
FIG. 6 shows pellets obtained from example D-11-6, which are placed on a millimeter paper.
Figure 7:
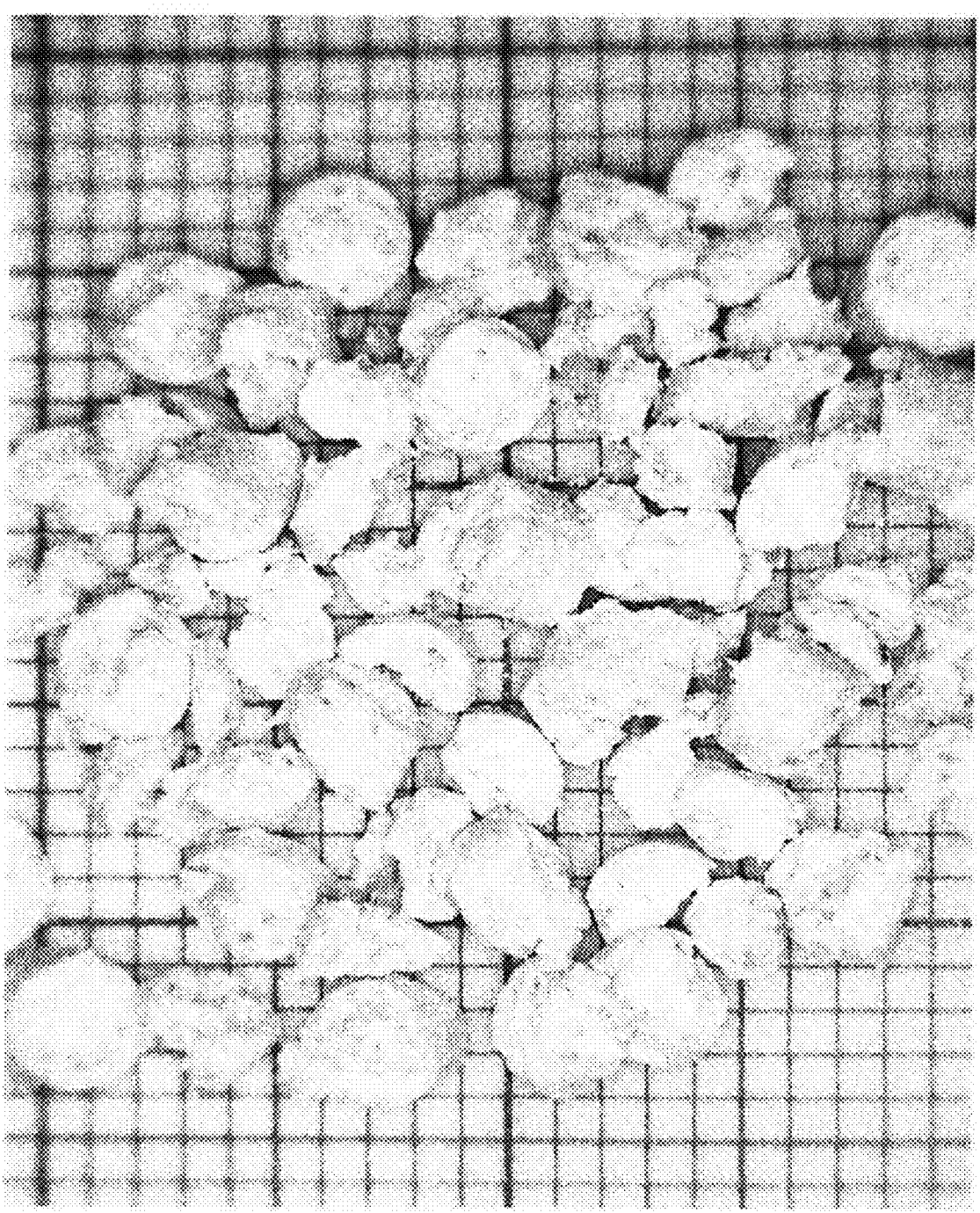
FIG. 7 shows pellets obtained from example D-11-7, which are placed on a millimeter paper.

The following examples illustrate further the invention without limiting it. Percentage values are percentage by weight if not stated differently.

A) Methods for Characterization

Mean particle size is determined, if not otherwise stated, by a Camsizer P4 from the Company Retsch Technology GmbH via digital image analysis. The measuring principle is a dynamic image analysis according to ISO 13322-2.

Bulk density is measured complying to DIN EN ISO 17892-3.

Melt flow index of a polymer is measured according to ISO 1133 on a Goettfert MI-Robo with the specifically stated parameters.

Differential scanning calorimetry (DSC) is measured according to EN ISO 11357-3 at atmospheric pressure. Heating cycles are (a) 0° C. to 200° C. at 10° C./min and 30 mL/min $N_2$, (b) 200° C. to 0° C. at 10° C./min and 30 mL/min $N_2$, (C) 0° C. to 200° C. at 10° C./min and 30 mL/min $N_2$. Melting range, melting peak temperature and melting enthalpy are determined at heating cycle (c).

High temperature gel permeation chromatography (HT-GPC) is measured according to ISO 16014-4. As an apparatus, an Agilent PL-GPC 220 with RI detector is used. As a precolumn, one Agilent PFgel Olexis Guard 50×7.5 mm column (part No. PL1110-1400) is used. As columns, three Agilent PLgel Olexis 13 μm 300×7.5 mm columns (part No. PL1110-6400) are used. The column temperature is 150° C. The calibration standards are polystyrene and High EasiVial GPC/SEC calibration standards from Agilent (part No. PL2010-0201 and part No. PL2010-0202). Trichlorobenzene is used as the eluent with a flow rate of 1 mL/min, a sample concentration of 3 mg/mL and an injection volume of 200 μL. A determined number average molecular weight Mn and a determined weight average molecular weight Mw are used to calculate a polydispersity index (PD) as the ratio between Mw and Mn.

Sieve analysis is conducted by a Camsizer P4 from the company Retsch Technology GmbH via digital image analysis. The measuring principle is a dynamic image analysis according to ISO 13322-2) with D10, D50 and D90 values.

The Norner attrition test is a test using a vibrating sieve shaker and glass beads to mechanically treat the tested form. An initial sieve analysis is conducted for 1 minute followed by further sieving using glass balls on the sieve decks to mechanically impact the material and measure the change of the sieve fractions after 5, 10 and 20 minutes. Sieves selected are bottom up: 200 μm, 500 μm, 1 mm, 1.6 mm, 2.5 mm and 4 mm. The used glass balls (company Sigmund Lindner GmbH, type P) are of 16 mm±0.02 mm, weight 5.36 g/glass ball and made of soda lime glass with fine matt surface.

The test procedure is as follow:
1. The sieve shaker without glass beads is charged with 50 g of a sample and the sieving with amplitude 1 mm is conducted for 1 minute. Measuring of mass on each sieve tray and sieve pan
2. Add 8 glass balls on sieve 500 μm; 9 glass balls on sieve 1.0 mm, 10 on sieve 1.6 mm and 11 on sieve 2.5 mm.

Proceed sieving for 5 minutes then measure mass on each sieve tray and sieve pan.

3. Proceed sieving for another 5 minutes, repeat weighing procedure.

4. Proceed sieving for another 10 minutes, repeat weighing procedure.

A Retsch Sieve Shaker AS 200 control from the company Retsch GmbH is used as sieve shaker.

Total fines are the sum of all material, which is collected from bottom plate and 200 μm mesh sieve. Accordingly, the fragments of a sample, which are generated under attrition stress and fall through a 500 μm mesh sieve (<500 μm), are considered fines. The particle size fraction in wt. %<500 μm after 20 minutes is the key result (Norner value) to determine abrasion and impact resistance of the tested form. The range of results can vary from 0% for extremely stable to 100% for extremely unstable.

An average weight of pellets is measured by taking a certain number of pellets (around 60 pellets), weighing the certain number of pellets to obtain an overall weight and dividing the overall weight by the certain number of the pellets.

An average length of the pellets is calculated by multiplying the average weight of pellets with an assumed density of 0.95 g/cm³ and dividing by the circular area of a circle with a pellet diameter of 3 mm.

B) Starting Material

SM-PS-1: Irciafos 168

Irgafos 168 (TM, commercially available from BASF SE, melting point between 180-183° C.), which contains tris(2,4-ditert-butylphenyl) phosphite (CAS-No. 31570-04-4) as depicted below

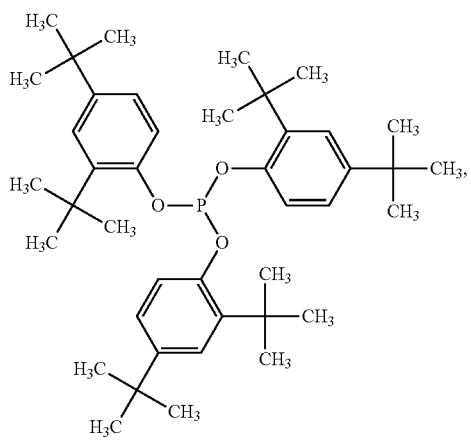 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

in the form of a powder, i.e. a loose bulk material with a bulk density of 467 g/L and a mean particle size of 400 μm.

SM-PS-2: Irganox 1010

Irganox 1010 (TM, commercially available from BASF SE, melting point between 113-126° C.), which contains tetrakis-[3-(3,5-ditert-butyl-4-hydroxy-phenyl)-propionyloxymethyl]methane (CAS-No. 6683-19-8) as depicted below

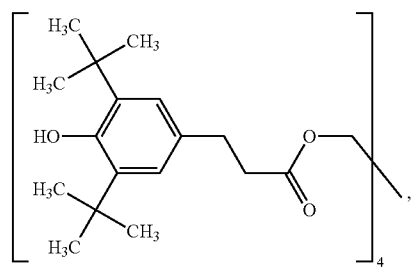

in the form of a powder, i.e. a loose bulk material with a bulk density of 530-630 g/L and a mean particle size of 141 μm.

SM-PS-3: Ceasit FI VEG

Ceasit FI VEG (TM, commercially available from Baerlocher GmbH, melting point between 140-160° C.) is a vegetable-based calcium stearate, which contains C16-18-fatty acids calcium salts for example with a stearic acid calcium salt (2:1) (CAS-No. 1592-23-0) as depicted below

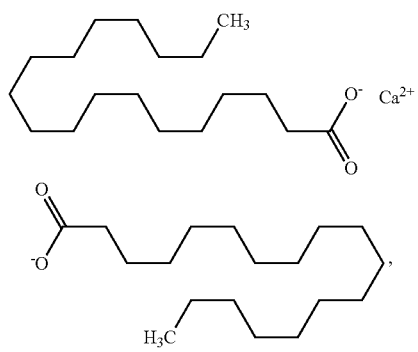

in the form of a powder, i.e. a loose bulk material with a bulk density of 200-400 g/L and a mean particle size of 90 μm.

SM-PS-4: Kezadol DAB-P

Kezadol DAB-P (TM, commercially available from Kettlitz-Chemie GmbH & Co. KG, melting point >>400° C.) is a calcium oxide (CAS-No. 1305-78-8) powder treated with a paraffin oil produced according to DAB 10 (Deutsches Apothekerbuch 10). Kezadol DAB-P has an active calcium oxide content of approximately 90% and is a loose bulk material with a bulk density of 650 g/L and a mean particle size of 6-7 μm.

SM-PA-1: Licocene PP 1302

Licocene PP 1302 (TM, commercially available from Clariant, employed commercial technical form: fine grain) is a propylene-ethylene copolymer wax (CAS-No. 9010-79-1), which is synthesized with a metallocene catalyst from propylene and ethylene. Branching of the long polymeric chains occurs by short chains (—$CH_3$). Some physical-chemical properties are measured and depicted in table B-1.

Technical data sheet states a density at 23° C. according to ISO 1183 of 0.87 g/cm³.

Technical data sheet states a drop point according to ASTM D 3954 of 87-93° C.

Technical data sheet states a viscosity at 170° C. according to DIN 53019 of 150-250 mPas.

Sieve analysis of the material in the technical form fine grain is measured and depicted in table B-2. A bulk density of 338 g/L is measured. The material in its technical form fine grain is employed for compaction.

sSM-PA-2: Petrolite EP-700

Petrolite EP-700 (TM, commercially available from Baker Hughes) is a propylene-ethylene copolymer wax (CAS-No. 9010-79-1). Controlled branching of the long polymeric chains occurs by short chains from propylene (—CH$_3$). Some physical-chemical properties are measured and depicted in table B-1.

Technical data sheet states a drop melting point according to ASTM D-127 of 96° C.

Technical data sheet states a viscosity at 99° C. of 12 pcs (120 mPas).

Petrolite EP-700 is milled in a disc mill PF 300 from Pallmann. Sieve analysis of the obtained ground material is measured and depicted in table B-2. A bulk density of the ground material of 473 g/L is measured. The ground material is employed for compaction.

SM-PA-3: Dow PG 7008

Dow PG 7008 (TM, commercially available from Dow Chemicals) is a low density polyethylene (CAS-No. 9002-88-4). Some physical-chemical properties are measured and depicted in table B-1

Technical data sheet states a density at 23° C. according to ASTM D-792 of 0.918 g/cm$^3$.

Technical data sheet states a melting temperature (DSC) of 106° C.

Technical data sheet states a vicat softening temperature according to ISO 306/A of 89.0° C.

Technical data sheet states a melt index (190° C./2.16 kg) according to ISO 1133 of 7.7 g/10 min.

Dow PG 7008 is milled in a disc mill PF 300 from Pallmann. Sieve analysis of the obtained ground material is measured and depicted in table B-2. A bulk density of the ground material of 285 g/L is measured. The ground material is employed for compaction.

SM-PA-4: Borflow HL 708 FB

Borflow HL 708 FB (TM, commercially available from Borealis) is a polypropylene (CAS-No. 9003-07-0). Some physical-chemical properties are measured and depicted in table B-1.

Technical data sheet states a melting temperature (DSC) of 158° C.

Technical data sheet states a melt index (130° C./2.16 kg) according to ISO 1133 of 800 g/10 min.

Borflow HL 708 FB is milled in a disc mill PF 300 from Pallmann. Sieve analysis of the obtained ground material is measured and depicted in table B-2. A bulk density of the ground material of 365 g/L is measured. The ground material is employed for compaction.

SM-PA-5: Licocene PP 1502

Licocene PP 1502 (TM, commercially available from Clariant, employed commercial technical form: fine grain) is a propylene-ethylene copolymer wax (CAS-No. 9010-79-1), which is synthesized with a metallocene catalyst from propylene and ethylene. Branching of the long polymeric chains occurs by short chains (—CH$_3$). Some physical-chemical properties are measured and depicted in table B-1.

Technical data sheet states a density at 23° C. according to ISO 1183 of 0.87 g/cm$^3$.

Technical data sheet states a drop point according to ASTM D 3954 of 83-90° C.

Technical data sheet states a viscosity at 170° C. according to DIN 53019 of 1500-2100 mPas.

Sieve analysis of the material in the technical form fine grain is measured and depicted in table B-2. A bulk density of 374 g/L is measured. The material in its technical form fine grain is employed for compaction.

TABLE B-1 measured physical-chemical properties of starting materials processing aids

| starting material | commercial name | DSC measurement | | | HT-GPC measurement | | |
|---|---|---|---|---|---|---|---|
| | | melting range [° C.] | melting peak temperature [° C.] | melting enthalpy [J/g] | Mn [Da] | Mw [Da] | PD |
| SM-PA-1 | Licocene PP 1302 | 24-95 | 76 | 23 | 6833 | 17285 | 2.53 |
| SM-PA-2 | Petrolite EP-700 | 27-104 | 88 | 218 | 1335 | 1532 | 1.15 |
| SM-PA-3 | Dow PG 7008 | 25-116 | 106 | 117 | 30176 | 367733 | 12.2 |
| SM-PA-4 | Borflow HL 708 FB | 120-173 | 157 | 109 | 25132 | 189565 | 7.54 |
| SM-PA-5 | Licocene PP 1502 | 45-95 | 73 | 13 | 16356 | 39302 | 2.40 |

TABLE B-2 sieve analysis

| starting material | Q3 10% [mm] | Q3 50% [mm] | Q3 90% [mm] |
|---|---|---|---|
| SM-PA-1 | 0.414 | 0.836 | 1.583 |
| SM-PA-2 (ground) | 0.324 | 0.710 | 1.538 |
| SM-PA-3 (ground) | 0.225 | 0.484 | 1.091 |
| SM-PA-4 (ground) | 0.359 | 0.716 | 1.145 |
| SM-PA-5 | 0.482 | 0.874 | 1.278 |

C) Preparation of Mixtures for Compaction

Mixtures for compaction consisting of polymer stabilizers and a processing aid are prepared by blending the starting materials as depicted in table C-11 in a 100-L MTI blender for 5 minutes at room temperature.

TABLE C-11 mixtures for compaction

| mixture-No. | polymer stabilizer | amount [%] | processing aid | amount [%] | physical form [c] |
|---|---|---|---|---|---|
| C-M-11 [b] | SM-PS-1 | 25 | none | — | powder |
| | SM-PS-2 | 25 | | | |

TABLE C-11-continued mixtures for compaction

| mixture-No. | polymer stabilizer | amount [%] | processing aid | amount [%] | physical form [c] |
|---|---|---|---|---|---|
| | SM-PS-3 | 10 | | | |
| | SM-PS-4 | 40 | | | |
| C-M-12 [a] | SM-PS-1 | 23.75 | SM-PA-1 | 5 | powder |
| | SM-PS-2 | 23.75 | | | |
| | SM-PS-3 | 9.5 | | | |
| | SM-PS-4 | 38 | | | |
| C-M-13 [a] | SM-PS-1 | 23 | SM-PA-1 | 8 | powder |
| | SM-PS-2 | 23 | | | |
| | SM-PS-3 | 9.2 | | | |
| | SM-PS-4 | 36.8 | | | |
| C-M-14 [a] | SM-PS-1 | 23 | SM-PA-5 | 8 | powder |
| | SM-PS-2 | 23 | | | |
| | SM-PS-3 | 9.2 | | | |
| | SM-PS-4 | 36.8 | | | |
| C-M-15 [b] | SM-PS-1 | 23 | SM-PA-2 | 8 | powder |
| | SM-PS-2 | 23 | | | |
| | SM-PS-3 | 9.2 | | | |
| | SM-PS-4 | 36.8 | | | |
| C-M-16 [b] | SM-PS-1 | 23 | SM-PA-3 | 8 | powder |
| | SM-PS-2 | 23 | | | |
| | SM-PS-3 | 9.2 | | | |
| | SM-PS-4 | 36.8 | | | |
| C-M-17 [b] | SM-PS-1 | 23 | SM-PA-4 | 8 | powder |
| | SM-PS-2 | 23 | | | |
| | SM-PS-3 | 9.2 | | | |
| | SM-PS-4 | 36.8 | | | |

Food notes:
[a] inventive
[b] comparative
[c] at room temperature and atmospheric pressure D) Pellets by a Compaction with a Flat Die Pellet Mill A flat die pellet mill, i.e. a Kahl Pelletizer Model 14-175, is used for compaction trials of materials as stated in table D-11. A Kahl flat die pellet mill is depicted for example in the "Handbuch fuer Kunststoff Additive", editors R. D. Maier, M. Schiller, Carl Hanser Verlag, Munich, ISBN 978-3-446-22352-3, 4th edition, 2016, page 1189, picture 14.9. The Kahl Pelletizer Model 14-175 possesses a fix flat die, which is equipped with nozzles, e.g. nozzles with a nozzle diameter of 3 mm and a press length of 6 mm or 10 mm. The diameter of the flat die is 175 mm. The nozzles expand with an angle of about 60° in flow direction (top down) of the flat die. The nozzle diameter is defined herein as the smallest diameter of the cylindric channel of the nozzle and press length is a distance, where the smallest diameter applies. The cylindric channel of the nozzle might expand after the press length, but the expanded part of the cylindric channel does not contribute for building up friction by the material to be compacted. The specifically applied nozzle diameter and press lengths are stated in table D-11.

The material for compaction is dosed at room temperature by a volumetric single screw feeder, which is placed above the pellet press section of the flat die pellet mill, by gravimetry into the pellet press section, which comprises the die with its nozzles and two rollers. The rollers, each with a diameter of 130 mm and a width 29 mm, have a flat surface. They are connected by a central vertical shaft and roll in a circle on the round flat die.

In the pellet press section, the two rollers push the material into the nozzles of the flat die, where the material is compacted and heated up by shear forces to a temperature, at which the processing aid starts to soften and in a sintering process the compacted material is granulated to cylindrical pellets. For beginning the process, the rotation of the rotors is set to 5 (=78 rpm). The material for compaction is fed as a powder into the press section. An initial starting phase of around 15 minutes is necessary until a stable running of the process is achieved. While initially a powder of the material for compaction is flowing through the nozzles, this changes towards formation of a strand at some materials for compaction and the flat die, the rollers and the nozzles are reaching a stable temperature. A temperature, which would be too high for a material for compaction, can result in a generation of a pasty mass, which blocks a further feeding of the material for compaction. At the outlet of the nozzle, the strand is cut/broken by four rotating knifes with an adjustable distance to the flat die to generate pellets with a length of around 1 to 3 times of the diameters of the pellets, i.e. around 3 mm to 9 mm. Ideally, the variation in length is minimal but a certain variation cannot be avoided due to the cutting/breaking. Table D-11 states whether pellets are obtained and thus also whether a strand was formed. The temperature of the flat die is measured by a sensor mounted form outside through a bore into the die. Once the process is running stable, the temperature of the collected pellets is measured by a manual IR-temperature sensor through measuring contactless the emitted IR irradiation and stated in table D-11 as surface temperature of the pellet. The flat die itself is not heated or cooled but experiences a warming due to the occurring friction of the material for compaction. The obtained pellets are sieved with a 1.6 mm sieve (200 mm diameter vibrating lab sieve) to separate fines from the obtained pellets. The amount of fines removed by sieving based on the overall amount of material for compaction is stated in table D-1 and D-3. The removed fines can be directly reused as material to be compacted. The pellets have cooled down to room temperature. If pellets are obtained, a Norner attrition test of the pellets after sieving is conducted and results are depicted in table D-11. Further characterizations of the obtained pellets are depicted in table D-12. Pictures of the pellets obtained at examples D-11-1 to D-11-7 are depicted at FIG. 11 to FIG. 17.

TABLE D-11 flat die pellet mill compactions and attrition test results

| example No. | material for compaction | composition [%] | nozzle size [c] [mm] | surface temperature of the pellet [° C.] | pellets | removed fines [%] | Norner test [%] |
|---|---|---|---|---|---|---|---|
| D-11-1 [b] | C-M-11 | SM-PS-1 (25) | 3 × 10 | 81 | yes | 16 | 67 |
| | | SM-PS-2 (25) | | | | | |
| | | SM-PS-3 (10) | | | | | |
| | | SM-PS-4 (40) | | | | | |

TABLE D-11-continued flat die pellet mill compactions and attrition test results

| example No. | material for compaction | composition [%] | nozzle size [c] [mm] | surface temperature of the pellet [° C.] | pellets | removed fines [%] | Norner test [%] |
|---|---|---|---|---|---|---|---|
| D-11-2 [a] | C-M-12 | SM-PS-1 (23.75)<br>SM-PS-2 (23.75)<br>SM-PS-3 (9.5)<br>SM-PS-4 (38.0)<br>SM-PA-1 (5) | 3 × 10 | 73 | yes | 13 | 39 |
| D-11-3 [a] | C-M-13 | SM-PS-1 (23)<br>SM-PS-2 (23)<br>SM-PS-3 (9.2)<br>SM-PS-4 (36.8)<br>SM-PA-1 (8) | 3 × 10 | 70 | yes | 15 | 26 |
| D-11-4 [a] | C-M-14 | SM-PS-1 (23)<br>SM-PS-2 (23)<br>SM-PS-3 (9.2)<br>SM-PS-4 (36.8)<br>SM-PA-5 (8) | 3 × 10 | 75 | yes | 12 | 10 |
| D-11-5 [b] | C-M-15 | SM-PS-1 (23)<br>SM-PS-2 (23)<br>SM-PS-3 (9.2)<br>SM-PS-4 (36.8)<br>SM-PA-2 (8) | 3 × 10 | 71 | yes | 21 | 70 |
| D-11-6 [b] | C-M-16 | SM-PS-1 (23)<br>SM-PS-2 (23)<br>SM-PS-3 (9.2)<br>SM-PS-4 (36.8)<br>SM-PA-3 (8) | 3 × 10 | 83 | yes | 19 | 62 |
| D-11-7 [b] | C-M-17 | SM-PS-1 (23)<br>SM-PS-2 (23)<br>SM-PS-3 (9.2)<br>SM-PS-4 (36.8)<br>SM-PA-4 (8) | 3 × 10 | 88 | yes | 25 | 65 |

Food notes:
[a] inventive
[b] comparative
[c] nozzle diameter × press length

From the results of the table D-11:
example D-11-1 shows that the reference blend C-M-11 without processing aid can be pelletized, but the Norner attrition test result is poor;
examples D-11-2, D-11-3 and D-11-4 show the best (lowest) Norner values; this shows that SM-PA-1 and SM-PA-5 lead to pellets with a significantly better Norner attrition test results than without a processing aid or with the other processing aids;
examples D-11-2, D-11-3 and D-11-4 versus example D-11-5 show than SM-PA-1 and SM-PA5 lead to pellets with a significantly better Norner attrition test result than SM-PA-2 despite of all three processing aids being a propylene-ethylene copolymer wax;
example D-11-5 and D-11-7 show that the amount of fines, which are generated at the process itself and removed by the 1.6 mm sieve, is not a reliable indicator for a beneficial Norner attrition test result;
example D-11-2 versus example D-11-3 shows that a higher amount of processing aid results in better Norner results.

TABLE D-12 pellet characterization

| example No. | material for compaction | composition [%] | pellet diameter [c] [mm] | average pellet length [d] [mm] | average pellet weight [mg] | picture at Fig. | Norner test [e] [%] |
|---|---|---|---|---|---|---|---|
| D-11-1 [b] | C-M-11 | SM-PS-1 (25)<br>SM-PS-2 (25)<br>SM-PS-3 (10)<br>SM-PS-4 (40) | 3 | 2.1 | 14.0 | 11 | 67 |
| D-11-2 [a] | C-M-12 | SM-PS-1 (23.75)<br>SM-PS-2 (23.75)<br>SM-PS-3 (9.5)<br>SM-PS-4 (38.0)<br>SM-PA-1 (5) | 3 | 2.0 | 13.5 | 12 | 39 |

TABLE D-12-continued

| | | | | average | average | | |
| | material | | | pellet | pellet | | Norner |
| | for | | pellet di- | pellet | pellet | | Norner |
| example | compac- | composition | ameter [c] | length [d] | weight | picture | test [e] |
| No. | tion | [%] | [mm] | [mm] | [mg] | at Fig. | [%] |
|---|---|---|---|---|---|---|---|
| D-11-3 [a] | C-M-13 | SM-PS-1 (23) SM-PS-2 (23) SM-PS-3 (9.2) SM-PS-4 (36.8) SM-PA-1 (8) | 3 | 1.9 | 12.7 | 13 | 26 |
| D-11-4 [a] | C-M-14 | SM-PS-1 (23) SM-PS-2 (23) SM-PS-3 (9.2) SM-PS-4 (36.8) SM-PA-5 (8) | 3 | 1.9 | 12.8 | 14 | 10 |
| D-11-5 [b] | C-M-15 | SM-PS-1 (23) SM-PS-2 (23) SM-PS-3 (9.2) SM-PS-4 (36.8) SM-PA-2 (8) | 3 | 1.7 | 11.7 | 15 | 70 |
| D-11-6 [b] | C-M-16 | SM-PS-1 (23) SM-PS-2 (23) SM-PS-3 (9.2) SM-PS-4 (36.8) SM-PA-3 (8) | 3 | 1.9 | 12.7 | 16 | 62 |
| D-11-7 [b] | C-M-17 | SM-PS-1 (23) SM-PS-2 (23) SM-PS-3 (9.2) SM-PS-4 (36.8) SM-PA-4 (8) | 3 | 2.1 | 14.0 | 17 | 65 |

Food notes:
[a] inventive
[b] comparative
[c] caused by the diameter of the nozzles
[d] calculated from average pellet weight
[e] results from table D-11 depicted again From the results of the table D-12:
all examples are in a similar range of an average pellet weight; the average weight is not a reliable indicator for a beneficial Norner attrition test result.

The invention claimed is:

1. A method for manufacturing a pellet in a pellet mill, which comprises a roller and a die with a nozzle, which method comprises the steps of
   (A) pressing a mixture for compaction by the roller through the nozzle to obtain a strand, and
   (B) comminuting the strand to obtain the pellet,
   wherein the mixture for compaction comprises the components
   (i) 87 to 97 wt. % of a polymer stabilizer mixture, which comprises the polymer stabilizers
      (i-1) 21 to 29 wt. % of tris (2,4-ditert-butylphenyl) phosphite (CAS-No. 31570-04-4),
      (i-2) 21 to 29 wt. % of tetrakis-[3-(3,5-ditert-butyl-4-hydroxy-phenyl)-propionyloxymethyl] methane (CAS-No. 6683-19-8),
      (i-3) 8 to 12 wt. % of a C16-C18 fatty acid calcium salt,
      (i-4) 36 to 44 wt. % of a calcium oxide, and wt. % of the polymer stabilizers (i-1), (i-2), (i-3) and (i-4) are based on the weight of the polymer stabilizer mixture, and
   (ii) 3 to 13 wt. % of a processing aid, which is a propylene-ethylene copolymer and which possesses a melting enthalpy below 100 J/g at 101.32 kPa, wherein the melting enthalpy is determined by a differential scanning calorimetry according to EN ISO 11357-3, and wt. % of the components (i) and (ii) are based on the weight of the mixture for compaction.

2. The method according to claim 1, wherein the processing aid possesses a weight average molecular weight above 10000 Da and below 80000 Da, and wherein the weight average molecular weight of the processing aid is determined by gel permeation chromatography (GPC).

3. The method according to claim 1, wherein the processing aid possesses a melting peak temperature above 50° C. and below 85° C., wherein the melting peak temperature is determined by a differential scanning calorimetry according to EN ISO 11357-3.

4. The method according to claim 1, wherein the polymer stabilizer mixture contains (i-3) 8 to 12 wt. % of a C16-C18 fatty acid calcium salt and 80 to 100 parts by weight of the C16-C18 fatty acid calcium salt is calcium stearate or calcium palmitate and parts by weight are based on the overall amount of C16-C18 fatty acid calcium salt in the polymer stabilizer mixture, which is 100 parts by weight.

5. The method according to claim 1, wherein the calcium oxide is in the form of a powder and the powder is hydrophobized or untreated.

6. The method according to claim 5, wherein the powder is hydrophobized by treatment with a paraffin oil or a fatty acid.

7. The method according to claim 1, wherein the processing aid is a propylene-ethylene copolymer, which is a wax.

8. The method according to claim 1, wherein the mixture for compaction comprises
   (i) 89 to 96 wt. % of the polymer stabilizer mixture, and
   (ii) 4 to 11 wt. % of the processing aid.

9. The method according to claim 1, wherein the strand has a surface temperature above 45° C. and below 110° C., wherein the strand surface temperature is determined by measurement of its infrared irradiation.

10. The method according to claim 1, wherein the method comprises a step (pre-A) feeding the mixture for compaction into the pellet mill, wherein the mixture for compaction is in the form of a powder, and the step (pre-A) occurs before the step (A).

11. The method according to claim 1, wherein the pellet mill is a ring die pellet mill, wherein the die has a geometric form of a ring with an inner side and an outer side and the nozzle represent a pass from the inner side to the outer side, or the pellet mill is a flat die pellet mill, wherein the die has a geometric form of a planar plate with an upper side and a lower side and the nozzle represents a pass from the upper side to the lower side.

12. A pellet, which comprises the components
   (i) 87 to 97 wt. % of a polymer stabilizer mixture, which comprises the polymer stabilizers
      (i-1) 21 to 29 wt. % of tris (2,4-ditert-butylphenyl) phosphite (CAS-No. 31570-04-4),
      (i-2) 21 to 29 wt. % of tetrakis-[3-(3,5-ditert-butyl-4-hydroxy-phenyl)-propionyl-oxymethyl] methane (CAS-No. 6683-19-8),
      (i-3) 8 to 12 wt. % of a C16-C18 fatty acid calcium salt,
      (i-4) 36 to 44 wt. % of a calcium oxide, and wt. % of the stabilizers (i-1), (i-2), (i-3) and (i-4) are based on the weight of the polymer stabilizer mixture, and
   (ii) 3 to 13 wt. % of a processing aid, which is a propylene-ethylene copolymer and which possesses a melting enthalpy below 100 J/g at 101.32 kPa, wherein the melting enthalpy of the processing aid is determined by a differential scanning calorimetry according to EN ISO 11357-3,
   and wt. % of the components (i) and (ii) are based on the weight of the pellet.

13. The pellet according to claim 12, which has a shape of a round rod and the round rod has a diameter of a circle, which is between 2 mm and 4 mm and has a length of 1 to 3 times of the diameter of a circle.

14. A method for manufacturing of a stabilized polymer, which comprises the steps of
   (AP) dosing a pellet as defined in claim 12 into a polymer to obtain a pellet-polymer mixture,
   (BP) exposing the pellet-polymer mixture to a temperature in the range of 120 to 340° C. under mechanical stirring to obtain a stabilized polymer,
   wherein the polymer is a polyolefin, a polystyrene or a mixture thereof.

15. A mixture for compaction, which comprises the components
   (i) 87 to 97 wt. % of a polymer stabilizer mixture in the physical form of a powder, which comprises the polymer stabilizers
      (i-1) 21 to 29 wt. % of tris (2,4-ditert-butylphenyl) phosphite (CAS-No. 31570-04-4),
      (i-2) 21 to 29 wt. % of tetrakis-[3-(3,5-ditert-butyl-4-hydroxy-phenyl)-propionyloxymethyl] methane (CAS-No. 6683-19-8),
      (i-3) 8 to 12 wt. % of a C16-C18 fatty acid calcium salt,
      (i-4) 36 to 44 wt. % of a calcium oxide, and wt. % of the polymer stabilizers (i-1), (i-2), (i-3) and (i-4) are based on the weight of the polymer stabilizer mixture, and
   (ii) 3 to 13 wt. % of a processing aid in the physical form of a powder, which is a propylene-ethylene copolymer and which possesses a melting enthalpy below 100 J/g at 101.32 kPa, wherein the melting enthalpy of the processing aid is determined by a differential scanning calorimetry according to EN ISO 11357-3,
   and wt. % of the components (i) and (ii) are based on the weight of the mixture for compaction.

* * * * *